(12) United States Patent
Hudak et al.

(10) Patent No.: US 12,369,751 B2
(45) Date of Patent: Jul. 29, 2025

(54) CONICAL BURR COFFEE GRINDER

(71) Applicant: Fellow Industries, Inc., San Francisco, CA (US)

(72) Inventors: Andrew Hudak, San Francisco, CA (US); Nicholas Terzulli, San Francisco, CA (US); Patrick Donaghy, Seattle, WA (US); Matthew Flowers, Laguna Niguel, CA (US)

(73) Assignee: Fellow Industries, Inc., San Francisco, CA (US)

( * ) Notice: Subject to any disclaimer, the term of this patent is extended or adjusted under 35 U.S.C. 154(b) by 211 days.

(21) Appl. No.: 17/974,340

(22) Filed: Oct. 26, 2022

(65) Prior Publication Data

US 2024/0138622 A1    May 2, 2024

(51) Int. Cl.
*A47J 42/36* (2006.01)
*A47J 42/06* (2006.01)
(Continued)

(52) U.S. Cl.
CPC .............. *A47J 42/36* (2013.01); *A47J 42/44* (2013.01); *A47J 42/50* (2013.01)

(58) Field of Classification Search
CPC .. A47J 42/36; A47J 42/02; A47J 42/06; A47J 42/44; A47J 42/50; A47J 42/08; A47J 42/40
See application file for complete search history.

(56) References Cited

U.S. PATENT DOCUMENTS 10,426,296 B2 * 10/2019 Ryan .................. A47J 42/54
11,013,361 B1 *  5/2021 Shen .................. A47J 31/40
(Continued)

FOREIGN PATENT DOCUMENTS

CN     105167615 A  * 12/2015  .............. A47J 31/42
CN     115054112 A  *  9/2022
(Continued)

OTHER PUBLICATIONS

English translate (CN115054112A), retrieved date Mar. 18, 2025.*
Partial European search report in European application No. 23206105.1, mailed on Mar. 25, 2024.

*Primary Examiner* — Mohammed S. Alawadi
(74) *Attorney, Agent, or Firm* — Cognition IP, P.C.; Edward Steakley; Justin White

(57) ABSTRACT

A conical burr coffee grinder can include a hopper that receives coffee beans, a grinding arrangement beneath the hopper, and a removable container beneath the grinding arrangement. The grinding arrangement can include an inner conical burr within an outer conical burr. At least one conical burr can rotate with respect to the other to grind the coffee beans into coffee grounds and dispense the coffee grounds into the container. The coffee beans and coffee grounds can follow a substantially vertical path from the hopper through the grinding arrangement and into the container, which can be multipurpose. A rotor gear can be coupled to the inner conical burr such that the rotor gear and inner conical burr rotate together as a combined unit. Additional components can include a rotational motor, a geartrain, a removable hopper lid, a grind adjustment assembly, a chute, an ionizer, a base, and a safety switch.

11 Claims, 26 Drawing Sheets

(51) Int. Cl.
*A47J 42/08* (2006.01)
*A47J 42/38* (2006.01)
*A47J 42/40* (2006.01)
*A47J 42/42* (2006.01)
*A47J 42/44* (2006.01)
*A47J 42/46* (2006.01)
*A47J 42/50* (2006.01)

(56) References Cited

U.S. PATENT DOCUMENTS

| | | | |
|---|---|---|---|
| 2008/0098901 A1* | 5/2008 | Lee | A47J 42/50 99/286 |
| 2018/0055288 A1* | 3/2018 | Rose | A47J 42/40 |
| 2018/0325320 A1* | 11/2018 | Guo | A47J 31/42 |
| 2019/0117020 A1* | 4/2019 | Mazzer | A47J 42/34 |
| 2019/0365155 A1* | 12/2019 | Mazzer | A47J 42/16 |
| 2021/0113020 A1* | 4/2021 | Fiorani | A47J 42/40 |
| 2024/0407603 A1* | 12/2024 | Guo | A47J 42/50 |

FOREIGN PATENT DOCUMENTS

| | | | | |
|---|---|---|---|---|
| DE | 19832413 A1 * | 1/2000 | | A47J 31/404 |
| EP | 3381339 A1 * | 10/2018 | | A47J 42/38 |
| GB | 2531287 A | 4/2016 | | |
| WO | WO-2016042324 A2 * | 3/2016 | | A47J 42/08 |
| WO | WO-2019076872 A1 * | 4/2019 | | A47J 31/42 |

\* cited by examiner

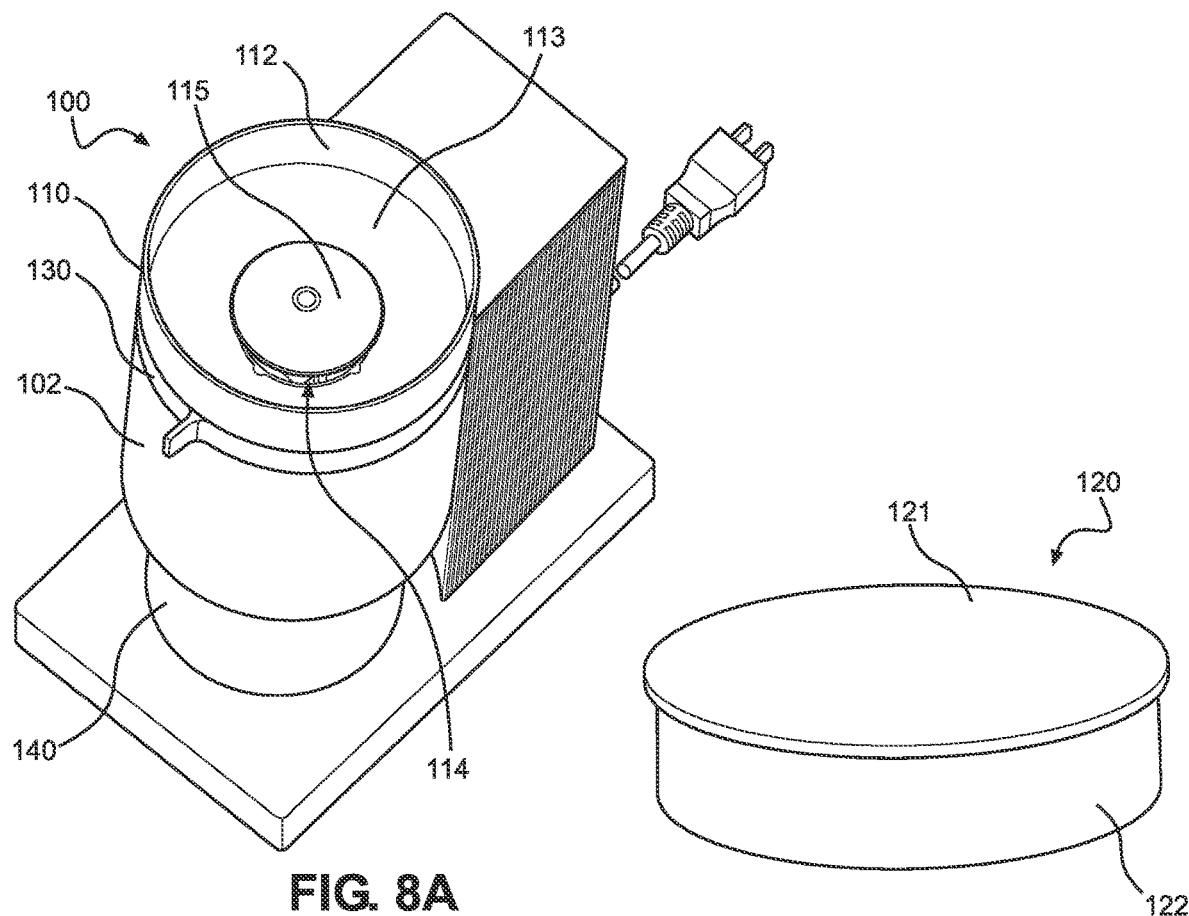
FIG. 8A
FIG. 8B
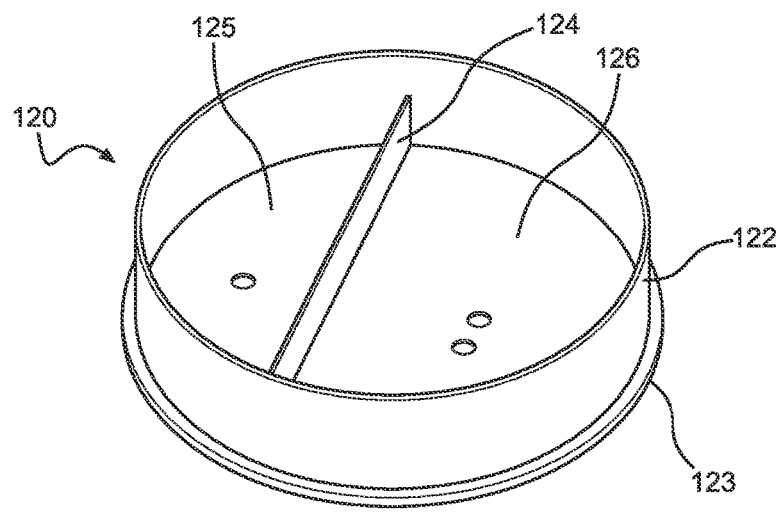
FIG. 8C

CONICAL BURR COFFEE GRINDER

TECHNICAL FIELD

The present disclosure relates generally to coffee related products, and more particularly to coffee grinders suitable for home and small environment use.

BACKGROUND

Conical burr coffee grinders are generally well known, and relatively smaller and simpler conical burr coffee grinders can allow home users to experiment with a wide array of ordinary and exotic coffee bean varieties. While simpler coffee grinders intended for home and small environment use can be relatively inexpensive and convenient, such simple coffee grinders often do not have all of the features and abilities of expensive industrial and commercial coffee grinders that are used in high volume production and sophisticated coffee shop environments.

Unfortunately, many types of home and nonindustrial coffee grinders are limited in the range of grind sizes that a given coffee grinder can obtain. While one given home coffee grinder can be capable of grinding coffee beans to a coarse grind size suitable for pour over cold brewing, for example, that same coffee grinder is unable to grind coffee beans to a consistently fine grind size or powder suitable for making espresso. As another limiting example, many home coffee grinders tend to have residue that is left behind from one ground batch to another, with such residue then leading to messes, waste, and/or lower purities in future ground batches.

Although traditional coffee grinders have worked well in the past, improvements are always helpful. In particular, what is desired are high quality coffee grinders that can produce various desirable sizes of coffee grounds, that result in minimal to no coffee residues or waste, and that are still suitable for use in home and other small environments.

SUMMARY

It is an advantage of the present disclosure to provide improved coffee grinders, which can include coffee grinders having conical burrs. The disclosed high quality coffee grinders can produce various desirable sizes of coffee grounds, can operate in a manner that results in minimal to no coffee residues or waste, and can still be inexpensive and suitable for small environment and home use. These advantages can be accomplished at least in part by utilizing efficient grinding arrangements, ionizing components, grind adjustment assemblies, multipurpose containers, and other components that facilitate use of the same coffee grinders for both coarse grounds and espresso grounds applications, among other possible features.

In various embodiments of the present disclosure, a conical burr coffee grinder can include a hopper configured to receive coffee beans, a grinding arrangement located beneath the hopper, and a container located beneath the grinding arrangement. The grinding arrangement can include an inner conical burr situated within an outer conical burr. At least one of the conical burrs can be configured to rotate with respect to the other conical burr to grind the coffee beans received in the hopper into coffee grounds. The container can be configured to receive the coffee grounds dispensed from the grinding arrangement. The coffee beans and coffee grounds can follow a substantially vertical path from the hopper through the grinding arrangement and into the container during operation of the conical burr coffee grinder.

In various detailed embodiments, the outer conical burr can be oriented about a vertical axis and can be configured to remain stationary while the inner conical burr rotates about the vertical axis to grind the coffee beans between the inner conical burr and the outer conical burr. The conical burr coffee grinder can also include a rotor gear located beneath and coupled to the inner conical burr such that the rotor gear and inner conical burr rotate together as a combined unit about the vertical axis, and the rotor gear can be configured to be driven at its outer circumference. The rotor gear can include one or more vertical openings therethrough between its center and its outer circumference and can be arranged such that substantially all coffee grounds formed by the inner conical burr and outer conical burr fall through the one or more vertical openings as part of the substantially vertical path. Further components can include a chute located between the grinding arrangement and the container, and an ionizer located at the chute. The chute can have an upper opening, an inner volume, and a lower opening, and the chute can be configured to receive coffee grounds through the upper opening, pass the coffee grounds through the inner volume, and direct the coffee grounds through the lower opening and into the container. The ionizer can be configured to project charged ions into the inner volume of the chute while coffee grounds pass through the inner volume, and the charged ions can remove static charge from the coffee grounds passing through the inner volume.

In further detailed embodiments, the conical burr coffee grinder can also include a rotational motor configured to drive the rotor gear, a geartrain between the rotational motor and the rotor gear, wherein the geartrain includes multiple intermediary gears, and/or a removable lid located atop the hopper. The removable lid can include multiple discrete dosing regions therewithin to facilitate the ready measurement of different amounts of coffee beans to be loaded into the hopper. The disclosed conical burr coffee grinder can also include a grind adjustment assembly located between the hopper and the grinding arrangement. This grind adjustment assembly can be configured to facilitate adjustment of the grind size of the coffee grounds formed by the inner conical burr and outer conical burr. Adjustment of the grind adjustment assembly can result in raising the outer conical burr with respect to the inner conical burr to increase the grind size of the coffee grounds or lowering the outer conical burr with respect to the inner conical burr to decrease the grind size of the coffee grounds. The grind adjustment assembly can include multiple different modes of user input for a user to adjust the grind size of the coffee grounds. A first mode of user input can be a grind adjustment ring located outside the coffee grinder beneath the hopper and a second mode of user input can be a calibration ring located inside the coffee grinder beneath the hopper. The grind adjustment assembly can be configured to allow adjustment of the grind size of the coffee grounds across a range from about 200 microns to about 1200 microns, which can correspond to espresso grounds and coarse pour over cold brewing grounds.

In various further embodiments of the present disclosure, a coffee grinder can include a hopper configured to receive coffee beans, a grinding arrangement located beneath the hopper, a grind adjustment assembly located between the hopper and the grinding arrangement, and a removable multipurpose container located beneath the grinding arrangement. The grinding arrangement can be configured to grind the coffee beans received in the hopper into coffee grounds. The grind adjustment assembly can be configured to facilitate user adjustment of the grind size of the coffee grounds formed by the grinding arrangement across a range from about 200 microns to about 1200 microns in diameter. The removable multipurpose container can be configured to receive coffee grounds dispensed from the grinding arrangement and can include a bottom, at least one sidewall, an upper opening, and an inner volume therebetween. The removable multipurpose container can be configurable to operate in a first mode for coffee grounds of about 1200 microns in diameter and to operate in a second mode different than the first mode for coffee grounds of about 200 microns in diameter.

In various detailed embodiments, the first mode can include the use of a removable lid having a lid opening that is smaller than the upper opening. The first mode can involve the removable lid being removably placed atop the upper opening of the removable multipurpose container such that coffee grounds dispensed from the grinding arrangement fall through the lid opening and into the internal volume of the removable multipurpose container. The at least one sidewall can include an external region and an internal region, and the internal region of the at least one sidewall can define an integrally formed spout configured to facilitate the pouring of the coffee grounds out of the removable multipurpose container. The second mode can include the use of a removable portafilter dosing cup having an upper flange, a dosing cup opening within the upper flange, and a dosing cup volume beneath the dosing cup opening. The second mode can involve the removable portafilter dosing cup being removably placed atop the upper opening of the removable multipurpose container such that the removable portafilter dosing cup blocks the internal volume of the removable multipurpose container so that coffee grounds dispensed from the grinding arrangement fall through the dosing cup opening and into the dosing cup volume. The upper flange can include one or more circular raised lips around the dosing cup opening, and the one or more circular raised lips can be configured to interface with a separate espresso portafilter such that the separate espresso portafilter can be centered atop the upper flange, and such that the removable multipurpose container, removable portafilter dosing cup, and separate espresso portafilter can all be flipped over together to dispense the coffee grounds from the dosing cup volume into the separate espresso portafilter. In various arrangements, the removable multipurpose container can also include a first magnetic component, and the coffee grinder itself can further include a base located beneath the grinding component and configured to support the removable multipurpose container at an upper surface thereof. The base can include a second magnetic component that is configured to interact with the first magnetic component to align automatically the removable multipurpose container with respect to a dispensing region of the coffee grinder when the removable multipurpose container is placed atop the base.

In still further embodiments of the present disclosure, a conical burr coffee grinder can include a hopper, a grinding arrangement, a grind adjustment assembly, a rotor gear, a chute, an ionizer, and a removable container. The hopper can be configured to receive coffee beans. The grinding arrangement can be located beneath the hopper and can include an inner conical burr situated within an outer conical burr, wherein the outer conical burr is oriented about a vertical axis and is configured to remain stationary while the inner conical burr rotates about the vertical axis to grind the coffee beans between the inner conical burr and the outer conical burr to form coffee grounds. The grind adjustment assembly can be located between the hopper and the grinding arrangement and can be configured to facilitate user adjustment of the grind size of the coffee grounds formed by the grinding arrangement across a range from about 200 microns to about 1200 microns in diameter. The rotor gear can be located beneath and coupled to the inner conical burr such that the rotor gear and inner conical burr rotate together as a combined unit about the vertical axis, and the rotor gear can be configured to be driven at its outer circumference. The rotor gear can include one or more vertical openings therethrough between its center and its outer circumference and can be arranged such that substantially all coffee grounds formed by the inner conical burr and outer conical burr fall through the one or more vertical openings. The chute can be located beneath the rotor gear and can have an upper opening, an inner volume, and a lower opening. The chute can be configured to receive coffee grounds through the upper opening from the rotor gear, pass the coffee grounds through the inner volume, and direct the coffee grounds through the lower opening. The ionizer can be located at the chute and can be configured to project charged ions into the inner volume of the chute while coffee grounds pass through the inner volume, such that the charged ions remove static charges from the coffee grounds passing through the inner volume. The removable container can be located beneath the lower opening of the chute and can be configured to receive the coffee grounds directed through the chute. The coffee beans and coffee grounds can follow a substantially vertical path from the hopper through the grinding arrangement, rotor gear, and chute, and into the removable container during operation of the conical burr coffee grinder.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed systems, apparatuses, features, and methods for conical burr coffee grinders. These drawings in no way limit any changes in form and detail that may be made to the disclosure by one skilled in the art without departing from the spirit and scope of the disclosure.

FIG. 8A illustrates in top perspective view the conical burr coffee grinder of FIG. 1 with its hopper lid removed according to one embodiment of the present disclosure.

FIG. 8B illustrates in side perspective view an example removable hopper lid for a conical burr coffee grinder according to one embodiment of the present disclosure.

FIG. 8C illustrates in bottom perspective view the removable hopper lid of FIG. 8B according to one embodiment of the present disclosure.

DETAILED DESCRIPTION

Figure 1:
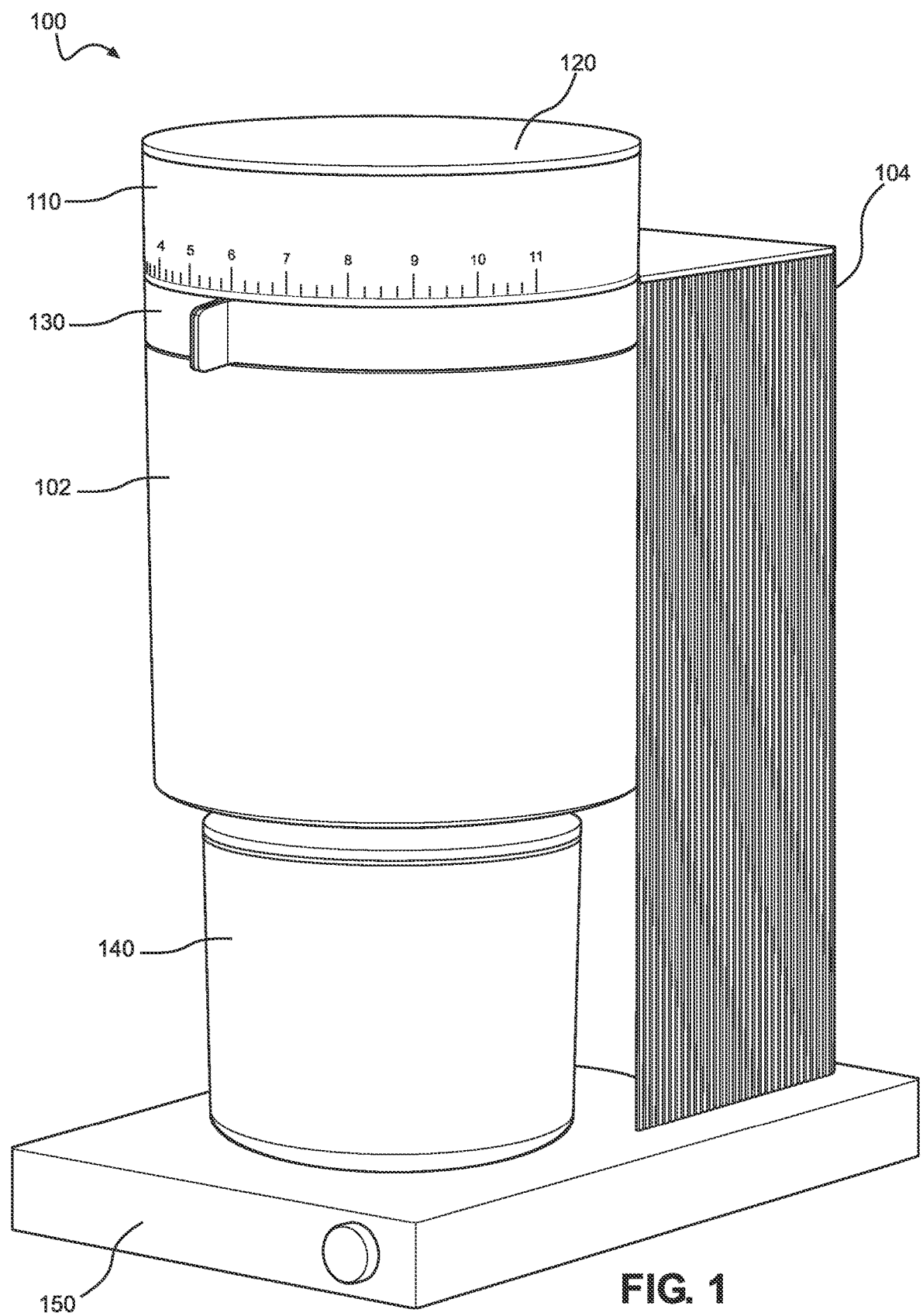
FIG. 1 illustrates in front perspective view an example conical burr coffee grinder according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to systems, apparatuses, features, and methods for improved coffee grinders, which can include coffee grinders having conical burrs. The disclosed high quality coffee grinders can produce various desirable sizes of coffee grounds, can operate in a manner that results in minimal to no coffee residues or waste, and can still be inexpensive and suitable for small environment and home use. In particular, the disclosed systems, apparatuses and features can include efficient grinding arrangements, ionizing components, grind adjustment assemblies, multipurpose containers, removable dosing lids, safety switches and other components that facilitate use of coffee grinders for both coarse grounds and espresso grounds applications, among various other components and features.

Although the various embodiments disclosed herein focus on a conical burr coffee grinder suitable for home use for purposes of simplicity in illustration, it will be readily appreciated that the disclosed systems, apparatuses, features, and methods can similarly be used for industrial grade coffee grinders, high-end commercial coffee grinders, and many other food processing or grinding applications. For example, disclosed coffee grinder components and features such as a substantially vertical processing path, a rotor gear having vertical openings therethrough, a grind adjustment assembly that facilitates grind sizes from 200 to 1200 microns in diameter, an ionizer that removes static charge from coffee grounds, and a removable multipurpose container can be used individually or in any combination for home coffee grinders and can also be used individually or in any combination for large commercial or industrial grinding applications, which applications can include conical burrs or other burr arrangements.

Referring first to FIG. 1, an example conical burr coffee grinder according to one embodiment of the present disclosure is illustrated in front perspective view. Conical burr coffee grinder 100 can be referred to as an "all-purpose grinder" since it can be readily used to grind coffee beans finely enough for espresso applications (e.g., 200 micron diameter grounds), coarsely enough for cold brew pour over applications (e.g., 1200 micron diameter grounds), and for various grind sizes in between. Conical burr coffee grinder 100 can generally be vertically oriented, although other orientations are also possible, and is large enough to be able to support large batch grinding, such as single ground batches that can be used for 12 cup brewing.

Among its outer items, conical burr coffee grinder 100 can include a grind chamber housing 102 that can contain various grinding components and related items, as well as an electrical component housing 104 that can contain various electrical components and related items. Conical burr coffee grinder 100 can also include various primary components, such as a hopper 110, a hopper lid 120, a grind adjustment ring 130, a container 140, and a base 150, among other possible primary components. Each of these primary components can include various parts, items, and features, many of which are described in greater detail below.

Figure 2A:
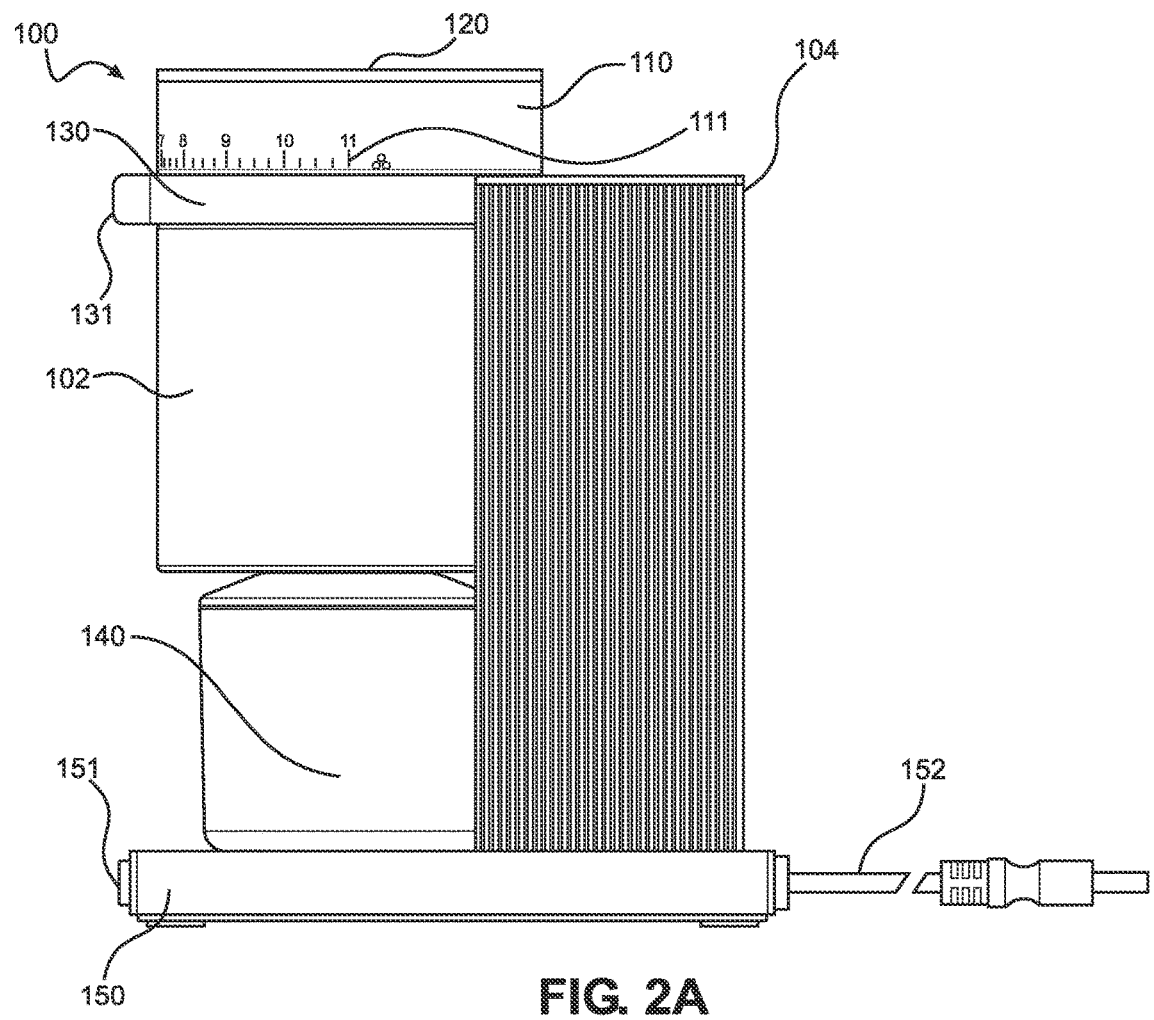
FIG. 2A illustrates in side elevation view the conical burr coffee grinder of FIG. 1 according to one embodiment of the present disclosure.
Figure 2B:
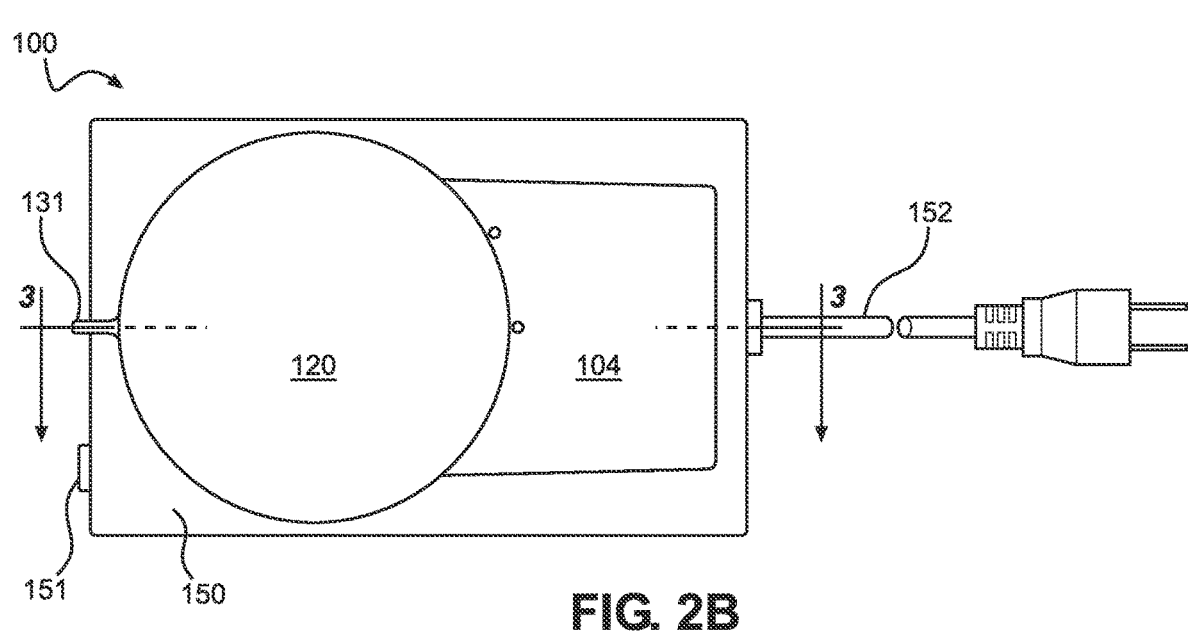
FIG. 2B illustrates in top plan view the conical burr coffee grinder of FIG. 1 according to one embodiment of the present disclosure.

Continuing with FIGS. 2A and 2B, the conical burr coffee grinder of FIG. 1 is shown in side elevation and top plan views respectively. In addition to the foregoing items, conical burr coffee grinder 100 can include grind setting markings 111 along hopper 110, a user tab 131 that extends from grind adjustment ring 130, and a power button 151 and a power cord 152 located about the base 150, among other possible items. In some arrangements, grind chamber housing 102 and electrical component housing can both form partial outer housings for their respective regions, such that one or more internal components may pass through and be contained within both of these regions. Although grind chamber housing 102 is shown as having a smooth and circular shape while electrical component housing 104 is shown as having a scalloped and circular shape, it will be readily appreciated that the grind chamber housing and/or the electrical component housing can have many other designs and shapes.

Power button 151 can be located along a side of base 150 to reduce grinds residue and other messes that might be greater and more likely to contaminate the button if it were at an upper surface location of the base 150. Power button 151 can allow for a single touch operation to start the grinding process, which can then stop automatically when the coffee grinder detects that there are no beans left to grind. Such detection can be by way of an intelligent drive system, for example, which can include one or more sensors that detect increased rotational speeds that reflect when no load is being applied to the grinding system. In the event that no load is detected when power button 151 is first pressed, then the coffee grinder can run for a set short amount of time before automatically stopping, such as ten seconds for example. As an additional function, the coffee grinder may continue to run as long as power button 151 is continuously pressed.

Figure 3:
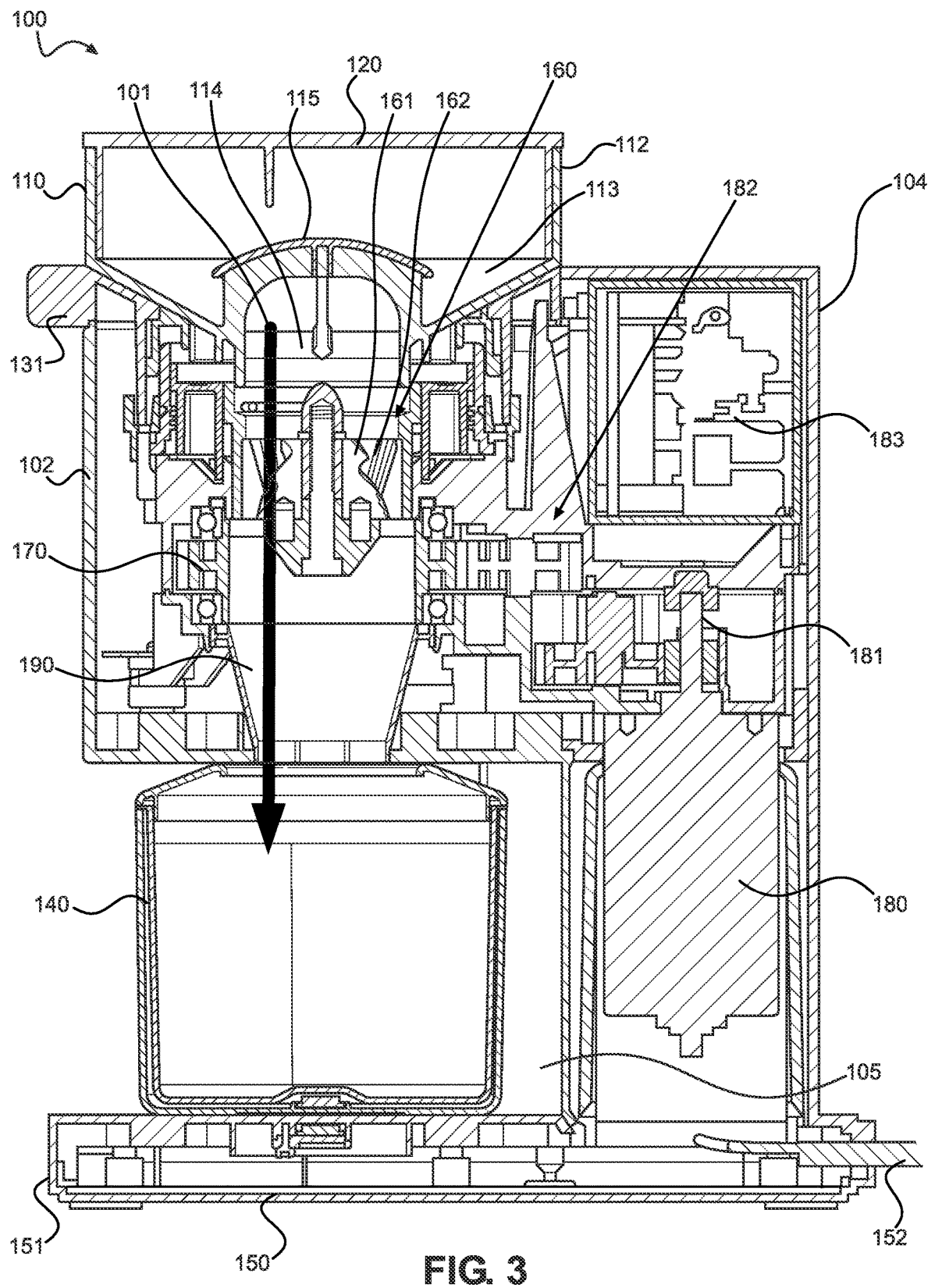
FIG. 3 illustrates in side cross-section view the conical burr coffee grinder of FIG. 1 according to one embodiment of the present disclosure.

Turning next to FIG. 3, the conical burr coffee grinder of FIG. 1 is illustrated in side cross-section view. Various internal components, items, and features of conical burr coffee grinder 100 are shown along the side cross-section 3 depicted in FIG. 2B. Overall, conical burr coffee grinder 100 can be arranged such that coffee beans and coffee grounds follow a substantially vertical path 101 from a whole bean state at hopper 110 to a fully ground state inside container 140 during operation of the conical burr coffee grinder. Such a substantially vertical processing path 101 can result in more efficient grinding with eliminated or reduce amounts of coffee ground waste and contamination, among other advantages.

Hopper 110 can form a cylindrically shaped reservoir that is configured to receive coffee beans when hopper lid 120 is removed. In various embodiments, hopper 110 can hold coffee beans sufficient for brewing up to 12 cups of coffee, although smaller or larger hopper sizes may also be used. Hopper 110 can include a circular sidewall 112 and a downward sloping floor 113, such that received coffee beans can slide downward and fall through opening 114 beneath hopper umbrella 115 and into grinds chamber 160. Hopper umbrella 115 can protect against coffee grounds or chunks of coffee beans flying backwards during grinding and can also shield various internal components within grinds chamber 160 from any coffee beans or foreign objects dropping from a significant height directly onto and damaging such internal components.

Grinds chamber 160 can be vertically oriented and can have a grinding arrangement that includes an inner conical burr 161 situated within an outer conical burr 162, both of which can be oriented about a vertical axis. At least one of conical burrs 161, 162 can be configured to rotate with respect to the other conical burr to grind the coffee beans received in the hopper and directed into the grinds chamber 160 into coffee grounds. In a particular embodiment, outer conical burr 162 can remain stationary while inner conical burr 161 rotates about the vertical axis to grind the coffee beans between the inner conical burr and the outer conical burr.

A rotor gear 170 can be located beneath and coupled to inner conical burr 161 such that the rotor gear and inner conical burr rotate together as a combined unit about the vertical axis. Rotor gear 170 can be configured to be driven indirectly by way of a rotational motor 180 located within electrical component housing 104. Rotational motor 180 can be configured to rotate a pinion 181 extending therefrom, and this pinion can drive multiple intermediary gears within a suitable geartrain 182 that in turn drive rotor gear 170 at its outer circumference. Rotational motor 180 can be controlled by way of an intelligent drive system including one or more processors, electrical components, hardware, and/or firmware located at a control region 183 within electrical component housing 104. In various arrangements, rotor gear 170 can include one or more vertical openings therethrough between its center and its outer circumference and can be arranged such that substantially all coffee grounds formed by inner conical burr 161 and outer conical burr 162 fall through such vertical opening(s) as part of substantially vertical path 101.

A chute 190 can be located between the grinding arrangement and container 140 and can be located directly beneath rotor gear 170. Chute 190 can have an upper opening, an inner volume, and a lower opening, which can combine to form a funnel shape. Chute 190 can be configured to receive coffee grounds through its upper opening from rotor gear 170, pass the coffee grounds through its inner volume, and direct the coffee grounds through its lower opening and into container 140, which can be a removable multipurpose container. An ionizer (not shown) can be located at chute 190 and can be configured to project charged ions into the inner volume of the chute while coffee grounds pass therethrough. Such charged ions can remove some or all of the static charges from the coffee grounds passing through the chute. Various features of chute 190 and the ionizer are provided in greater detail below.

User tab 131 can extend from a grind adjustment ring, as noted above, and these items can form part of a grind adjustment assembly that can be located between hopper 110 and the grinding arrangement. Such a grind adjustment assembly can be configured to facilitate adjustment of the grind size of the coffee grounds formed by inner conical burr 161 and outer conical burr 162. Adjustment of the grind adjustment assembly can result in raising outer conical burr 162 with respect to inner conical burr 161 to increase the grind size of the coffee grounds formed between the burrs or lowering the outer conical burr with respect to the inner conical burr to decrease the grind size of the coffee grounds formed between the burrs. Various features of the grind adjustment assembly are provided in greater detail below.

Container 140, which can be removable, multipurpose, or both, can be placed atop base 150 and positioned directly beneath the lower opening of chute 190 to catch coffee grounds dispensed from the chute. Container 140 can be circular shaped, while inside lower portion 105 of electrical component housing 104 can be suitably concave shaped to facilitate placement of container 140 atop base 150 proximate this inside lower portion of the housing. Various features of a removable multipurpose container 140 are provided in greater detail below. Again, the various components of conical burr coffee grinder 100 can be arranged such that the coffee beans and coffee grounds passing through the coffee grinder follow a substantially vertical path from the hopper through the grinding arrangement within grinds chamber 160, through rotor gear 170, through chute 190, and into container 140 during operation of the conical burr coffee grinder.

In some embodiments, an intelligent drive system can function to drive rotor gear 170 at an appropriate rotational speed during a typical grinding process, as well as to utilize feedback and respond to various grinding states, such as full load, no load, and jammed. The intelligent drive system can operate to drive rotor gear 170 at a constant rotational speed for a more consistent grind size across all coffee grounds. For example, a constant rotational speed of about 300-350 revolutions per minute ("RPM") has been found to be a suitable rotational speed for rotor gear 170 (and thus inner conical burr 161) to facilitate a consistent grind. As will be readily appreciated, grinding espresso typically requires higher torque than grinding filter coffee, such that rotational motor 180 can be a 150 watt direct current electric motor capable of grinding espresso with a suitable gear arrangement to get high enough power output to rotor gear 170. To ensure that a sufficient amount of torque is delivered for the grinding of espresso and other fine grind sizes, rotor gear 170 can be driven at or below about 6 Nm of torque. To achieve this rotational speed and torque for rotor gear 170, rotational motor 180 can be a direct current low power electric motor that operates to rotate its pinion 181 at about 15,000 RPM, for example, and a suitable amount of gear reduction between pinion 181 and rotor gear 170 can be achieved via multiple intermediary gears within geartrain 182.

In some arrangements, an intelligent drive system can include hardware and firmware and can be configured to detect changes in current consumption by rotational motor 180. For example, a PCB in control region 183 can include one or more processors, a current transformer, and one or more passive components configured to monitor the current consumed by rotational motor 180. Various algorithms can then be used to look for significant changes in current consumption by rotational motor 180. For example, significant decreases in current consumption can indicate the end of a grind cycle, while significant increases in current consumption can indicate a stalled motor that can result from a jammed grinder. An "auto-stop" feature can result in the grinder turning itself off when it detects a significant decrease in motor current consumption, such as when no more beans are being ground. A "jam detection" feature can similarly result in the grinder turning itself off when it detects a significant increase in motor current consumption, such as when the conical burrs are jammed and thus no gears or motor pinion can rotate. Other types of intelligent drive systems are also possible, and other components, features, and details for an intelligent drive system for a coffee grinder can be found in, for example, International Patent Publication No. WO 2021/113790 titled "COFFEE GRINDER," which is incorporated herein by reference.

Figure 4A:
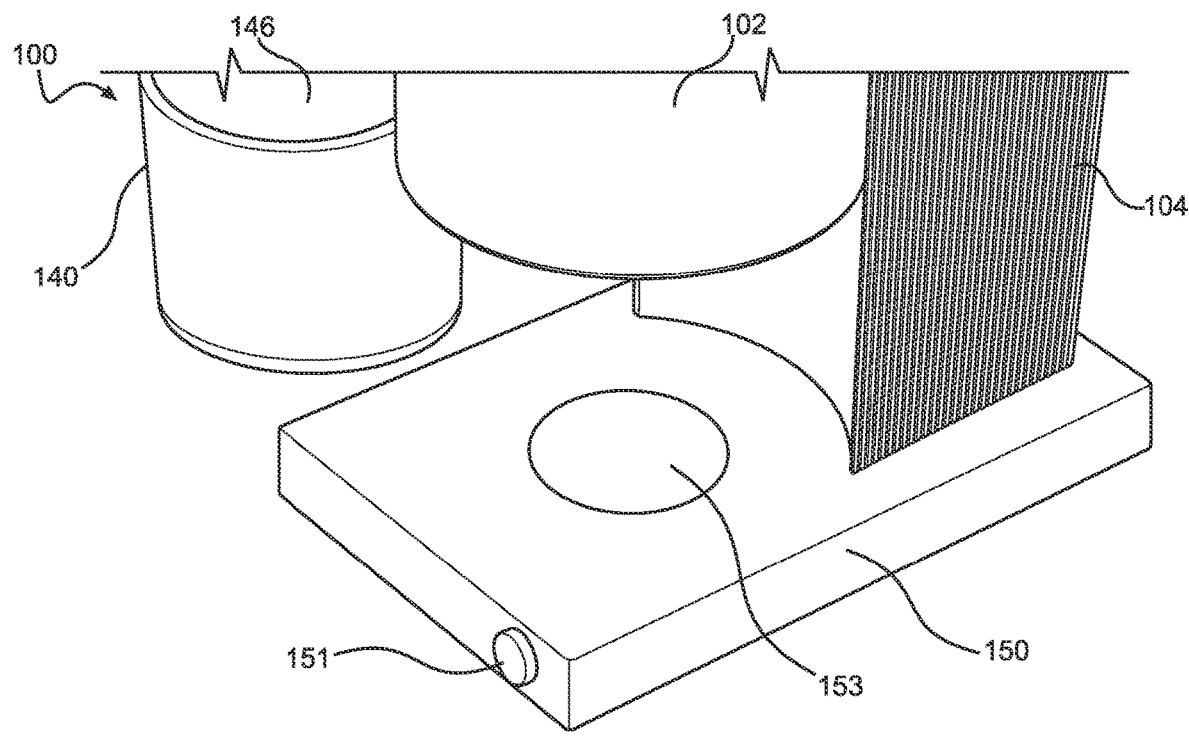
FIG. 4A illustrates in top perspective view the conical burr coffee grinder of FIG. 1 with its container removed according to one embodiment of the present disclosure.

Transitioning now to FIG. 4A, the conical burr coffee grinder of FIG. 1 is shown in top perspective view with its container removed. Removable multipurpose container 140, which may also be referred to as a "catch," can typically be placed atop and removed from a dispensing region 153 of base 150 such that it is under the chute of conical burr coffee grinder 100 to catch coffee grounds during a grinding process. Fresh coffee grounds can then be captured into the removable multipurpose container or catch 140, and a user can transport the coffee grounds in this container or catch 140 to another location and pour them out to make coffee.

To reduce or eliminate waste or mess, it is preferable that removable multipurpose container 140 be accurately aligned beneath the chute so that all coffee grounds fall into the container. An optimal horizontal alignment results when the removable multipurpose container is perfectly centered on dispensing region 153 on an upper surface of base 150. Substantially all coffee grounds dispensed from the chute are received into removable multipurpose container 140 with no spill when the container is aligned horizontally at an optimal horizontal alignment with respect to the chute of conical burr coffee grinder 100. To facilitate an optimal or accurate alignment, a catch magnet can be located at the bottom center of removable multipurpose container 140 and a corresponding base magnet can be located beneath dispensing region 153. The catch magnet and base magnet can be arranged such that a magnetic attraction occurs when removable multipurpose container 140 is placed on top of dispensing region 153. The magnets then interact to move or slightly adjust removable multipurpose container 140 horizontally across base 150 and align it accurately beneath the chute of the coffee grinder.

Figure 4B:
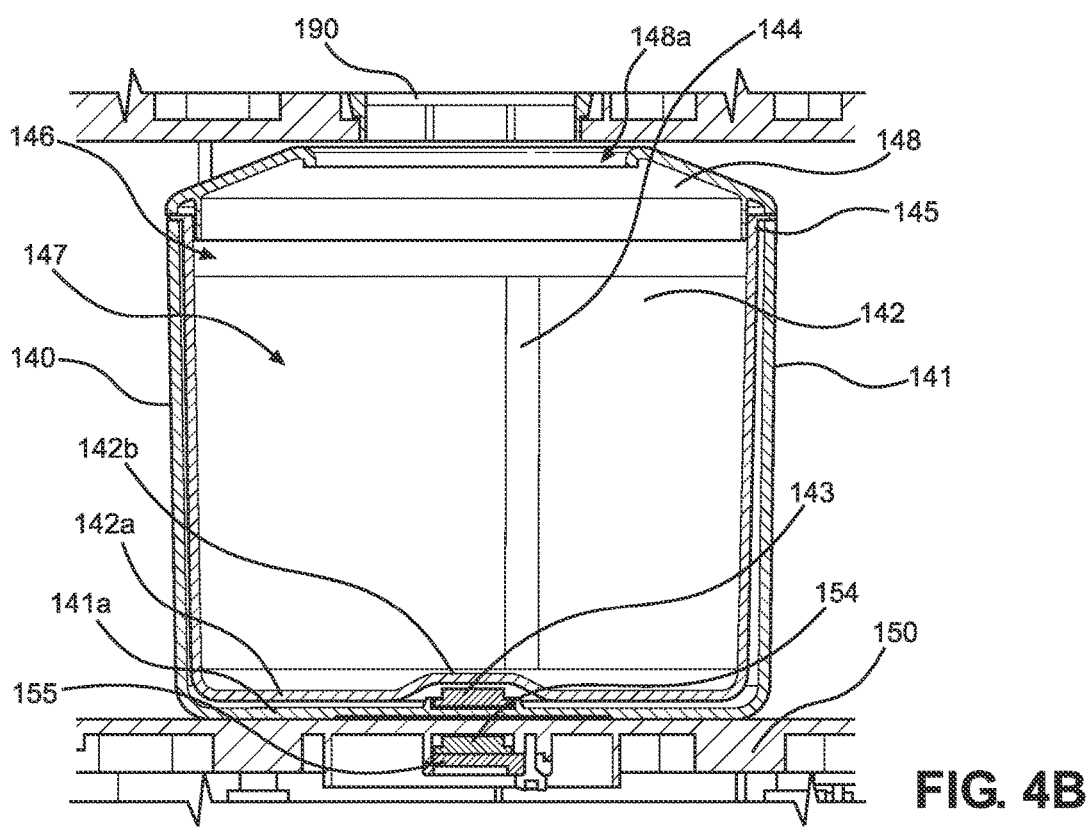
FIG. 4B illustrates in side cross-section view an example removable multipurpose container on a coffee grinder base according to one embodiment of the present disclosure.

Continuing with FIG. 4B, an example removable multipurpose container situated on a coffee grinder base is illustrated in side cross-section view. As shown, base 150 can include a base magnet 154 within a base magnet cap or enclosure 155, with both of these items located just beneath the dispensing region on the upper surface of the base. Removable multipurpose container or catch 140 can include one or more outer sidewalls 141 surrounding one or more inner sidewall portions 142. The one or more outer sidewalls 141 can be a single circular outer sidewall, which can be integrally formed with or otherwise coupled to an outer bottom 141a. Similarly, one or more inner bottom portions 142a can be integrally formed with or otherwise coupled to inner sidewall portion(s) 142.

A catch magnet 143 can be centrally positioned between a flat region of the outer bottom 141a and a raised central portion 142b of the inner bottom portion(s) 142a, as shown. It will be readily appreciated that catch magnet 143 and base magnet 154 can be any magnetic components arranged to have a magnetic attraction force between them. In some instances, only one of these components needs to be a magnet, while the other may simply be a metallic item. In some instances, both of these components can be magnets, and the magnets can be arranged such that opposite poles for each magnet are facing each other in the positions shown.

Removable multipurpose container 140 can include an inner spout 144 that extends vertically along its inner sidewall portion(s) 142 to facilitate pourability of coffee grounds contained therein. Removable multipurpose container 140 can also include an upper lip 145 where the upper edges of outer circular sidewall 141 and inner sidewall portion(s) 142 meet, and this upper lip can define an upper opening 146 at the top of the container. The removable multipurpose container 140 can also define an internal volume 147 between its bottom, sidewall portion(s) and upper opening 146. As shown in FIG. 4B, a removable lid 148 can be fitted or otherwise placed atop removable multipurpose container 140, such as when the container is configured to operate in a first mode for larger coffee grounds, such as those of about 1200 microns in diameter. Removable lid 148 can include a lid opening 148a that is smaller than upper opening 146 of the container 140, and this lid opening can be positioned such that it centered directly under the lower opening of chute 190, which chute can function as a dispensing region of the overall coffee grinder.

Figure 5A:
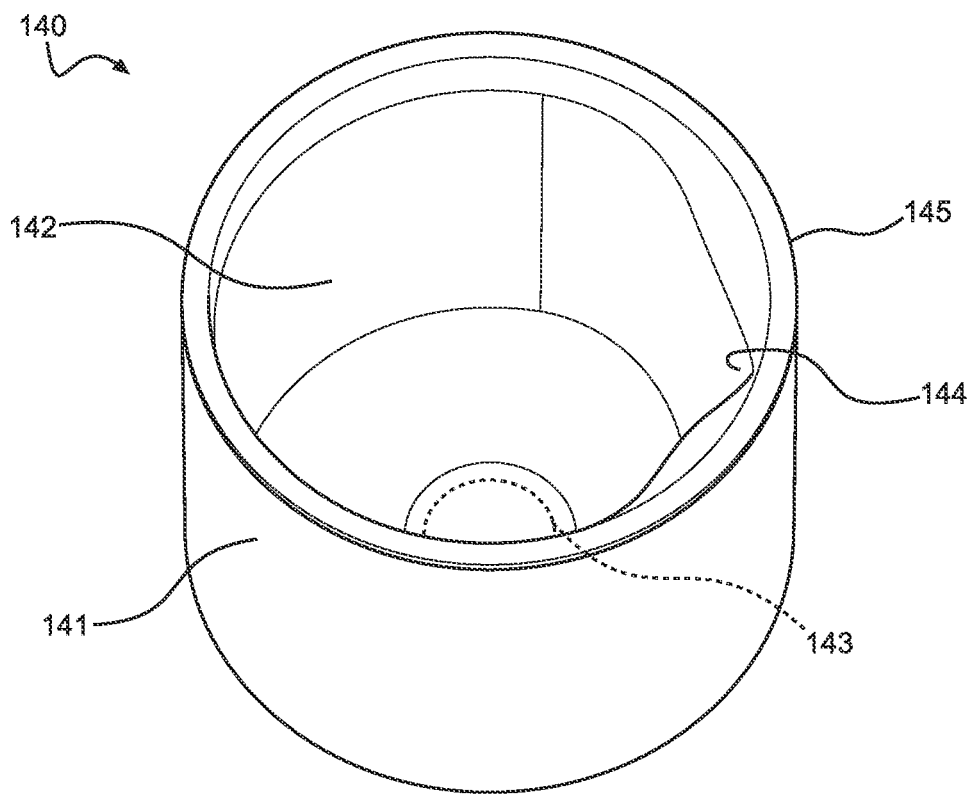
FIG. 5A illustrates in top perspective view an example removable multipurpose container for a coffee grinder according to one embodiment of the present disclosure.
Figure 5B:
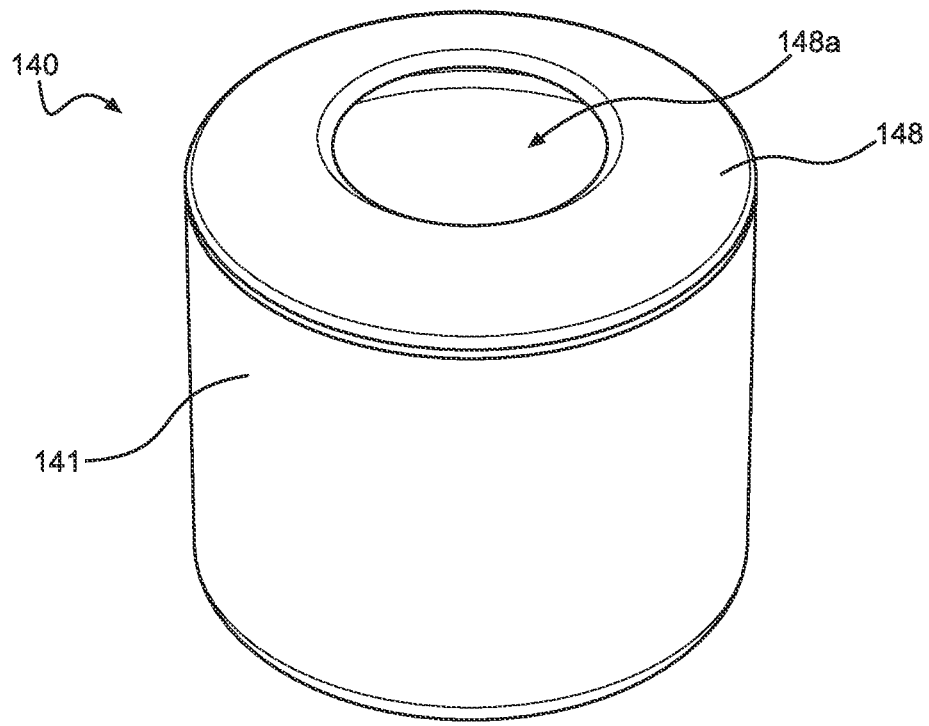
FIG. 5B illustrates in side perspective view the removable multipurpose container of FIG. 5A with a removable lid installed according to one embodiment of the present disclosure.

FIG. 5A illustrates an example removable multipurpose container for a coffee grinder in top perspective view, while FIG. 5B illustrates the removable multipurpose container in side perspective view with a removable lid installed. As shown in FIG. 5A, removable multipurpose container 140 (e.g., catch) again can include an outer circular sidewall 141 and one or more inner sidewall portions 142, one or all of which can include bottom portions that can be integrally formed therewith or otherwise coupled thereto. As noted above, a catch magnet 143 can be positioned between these bottom portions at a central bottom location, and an upper lip 145 can be formed around an upper circumference to define an upper opening of container or catch 140.

In some arrangements, inner sidewall portion(s) 142 can involve fastening together two mirror image shaped wall portions that are partially circular in one region and partially straight in another region to form a full inner circumference around the inner volume of removable multipurpose container 140, as shown. One, two, or more inner sidewall portion(s) 142 can be shaped such that an inner spout 144 is formed to facilitate an efficient pouring of coffee grounds from the container or catch 140 when it is held sideways and tilted downward. Any type of lid or other top component can be removed from the container or catch 140 for such a pouring or removal function of coffee grounds, as will be readily appreciated.

As shown in FIG. 5B, a removable lid 148 can be fitted or otherwise placed atop removable multipurpose container 140 when the container is configured to operate in a first mode for larger coffee grounds, which can be dispensed into the container through lid opening 148a when the container is placed beneath the chute or other dispensing component of an associated coffee grinder. Removable lid 148 can have one or more features along its bottom to facilitate a fit with the upper lip 145 of removable multipurpose container 140. For example, removable lid 148 can include protrusion tabs around its lower circumference to facilitate a snap fit of the removable lid into the removable multipurpose container at any rotational orientation.

Figures 6A, 6B:
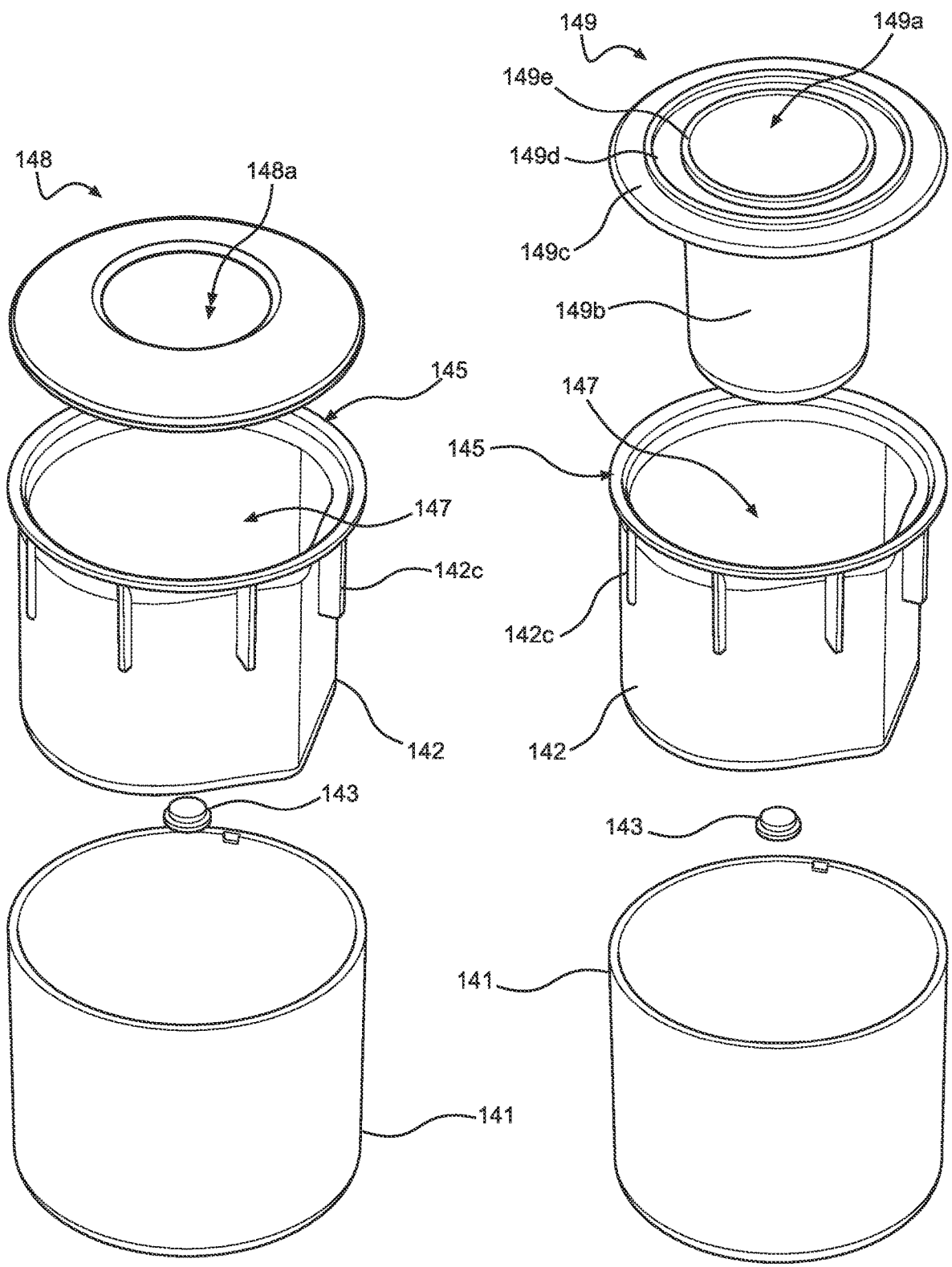
FIG. 6A illustrates in side exploded view the removable multipurpose container of FIG. 5A with an example removable lid according to one embodiment of the present disclosure.
FIG. 6B illustrates in side exploded view the removable multipurpose container of FIG. 5A with an example removable portafilter dosing cup according to one embodiment of the present disclosure.

Continuing with FIGS. 6A and 6B, the removable multipurpose container of FIG. 5A is shown in side exploded views with an example removable lid in FIG. 6A and alternatively with an example removable portafilter dosing cup in FIG. 6B. Again, a catch magnet 143 can be centrally positioned between bottom regions of outer circular sidewall 141 and inner sidewall portion(s) 142, both of which can be integrally formed with bottom regions or have bottom components attached thereto. Inner sidewall portion(s) 142 can include multiple ribs 142c extending therefrom, which ribs can facilitate a firm press fit and fastening with outer circular sidewall 141 to form the removable multipurpose container. Upper lip 145 of inner sidewall portion(s) 142 can facilitate operation in multiple different modes depending upon which lid or other removable item is placed atop the upper lip for container use.

As one example, a first mode of operation reflected in FIG. 6A can involve a removable lid 148 being fitted or otherwise placed atop removable multipurpose container 140. Removable lid 148 can be used when grinding regular or larger coffee grounds (e.g., about 400-1200 microns in diameter), which can be dispensed into the container through lid opening 148a. Removal of removable lid 148 can then facilitate pouring coffee grounds from the internal volume 147 of removable multipurpose container 140, such as by way of an inner spout, as noted above. Collection of coffee grounds into and pouring from internal volume 147 can be considered as part of the first mode of operation for removable multipurpose container 140.

As another example, a second mode of operation reflected in FIG. 6B can involve a removable portafilter dosing cup 149 being fitted or otherwise placed atop the removable multipurpose container 140. Removable portafilter dosing cup 149 can be used when grinding espresso or small coffee grounds (e.g., about 200-400 microns in diameter), which can be dispensed from the coffee grinder into removable portafilter dosing cup 149 through dosing cup opening 149a and collected in dosing cup volume 149b. Removable portafilter dosing cup 149 can include upper flange 149c that can be configured to be fitted or otherwise placed atop upper lip 145 of removable multipurpose container 140. Upper flange 149c can be sized and shaped such that it blocks coffee grounds from entering the internal volume 147 of container 140, and such that coffee grounds only enter the dosing cup volume 149b through dosing cup opening 149a within the upper flange.

In various arrangements, upper flange 149c can include one or more circular raised lips 149d, 149e around dosing cup opening 149a. The circular raised lips 149d, 149e can be configured to interface with a separate espresso portafilter such that the separate espresso portafilter can be centered atop upper flange 149c. For example, a separate espresso portafilter can include its own internal volume and upper opening, and an empty espresso portafilter can be turned upside down and placed atop upper flange 149c such that its upper opening faces dosing cup opening 149a. When espresso grounds are contained within dosing cup volume 149b, the removable multipurpose container 140, removable portafilter dosing cup 149, and separate espresso portafilter can all be flipped over together to dispense the espresso grounds from the dosing cup volume 149b into the separate espresso portafilter. This can facilitate an easy, clean, and waste-free transfer of espresso or small coffee grounds from the removable portafilter dosing cup 149 into the separate espresso portafilter, as will be readily appreciated.

Each circular raised lip 149d, 149e around dosing cup opening 149a can be sized and shaped to interface with a different standard sized espresso portafilter. For example, circular raised lip 149d can be sized to interface with a standard 58 mm espresso portafilter, such that the outer circumference around the upper opening of the 58 mm espresso portafilter presses against the inner circumference of circular raised lip 149d. As another example, circular raised lip 149e can be sized to interface with a standard 54 mm espresso portafilter, such that the inner circumference around the upper opening of the 54 mm espresso portafilter presses against the outer circumference of circular raised lip 149e. Other raised lips and/or other features can also be used with removable portafilter dosing cup 149 to facilitate interactions with other separate espresso portafilters or other possible separate items.

Figure 7A:
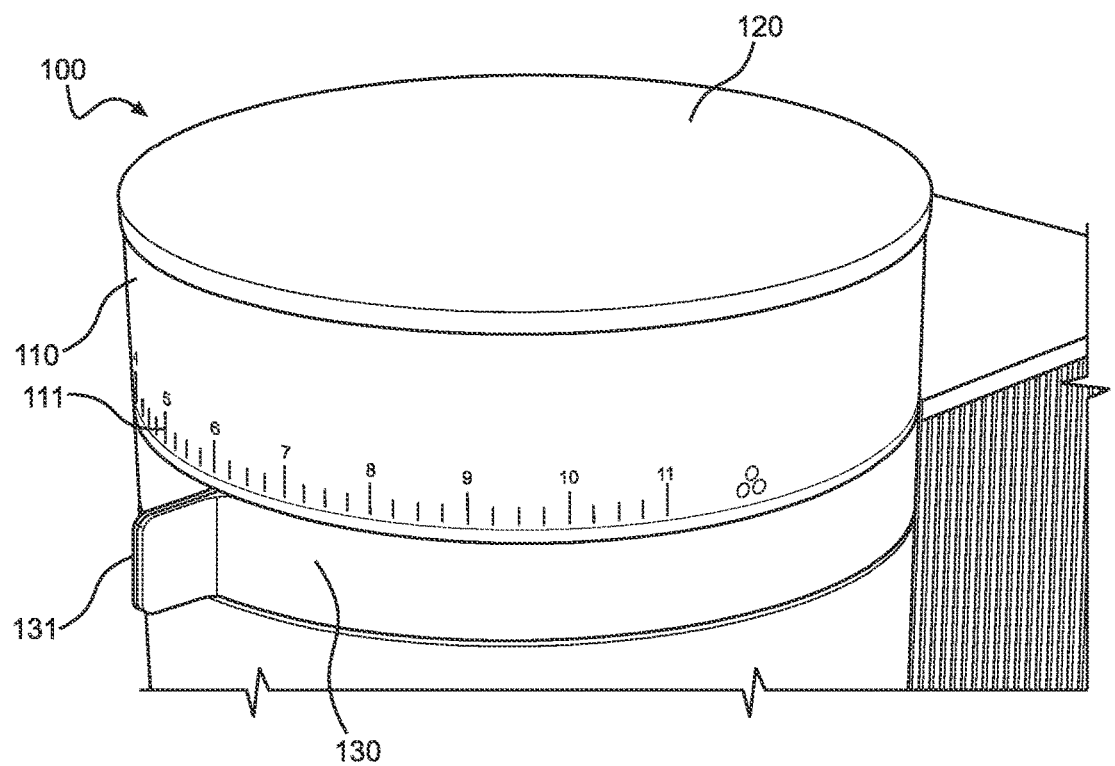
FIG. 7A illustrates in side perspective view an example hopper and grind adjustment ring for a conical burr coffee grinder according to one embodiment of the present disclosure.
Figure 7B:
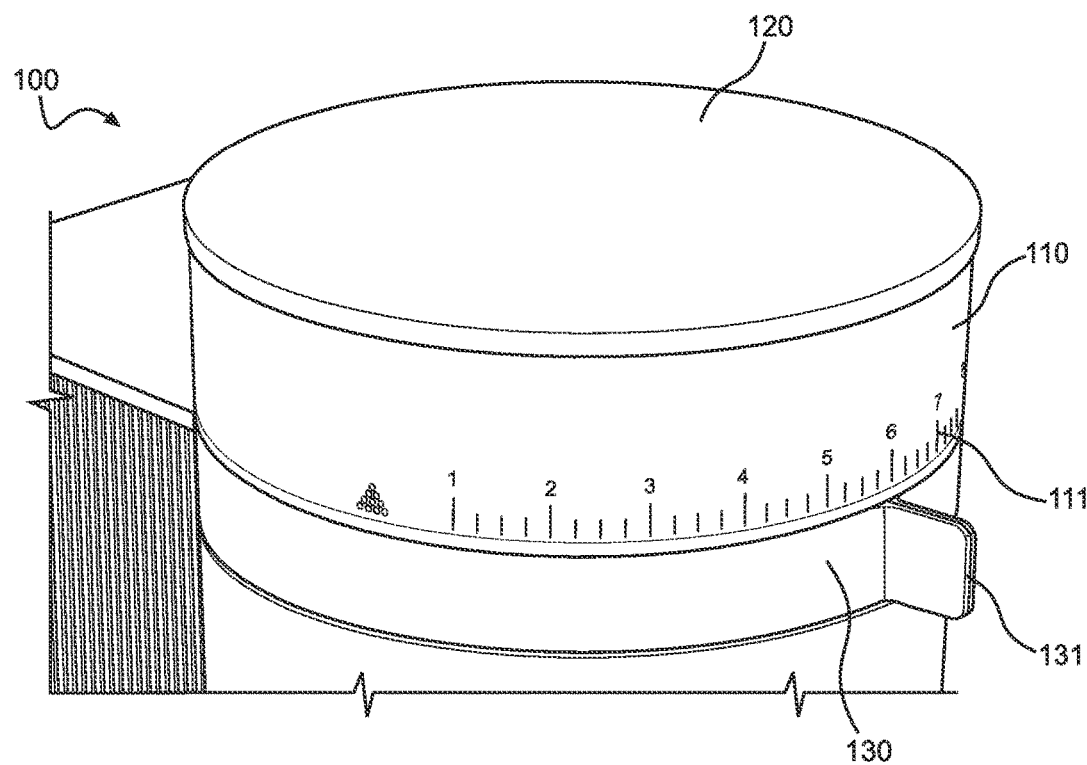
FIG. 7B illustrates in obverse side perspective view the hopper and grind adjustment ring of FIG. 8A according to one embodiment of the present disclosure.

Transitioning next to FIGS. 7A and 7B, an example hopper and grind adjustment ring for a conical burr coffee grinder are illustrated in side perspective and obverse side perspective views respectively. At the top of conical burr coffee grinder 100, hopper lid 120 can be removably fit atop hopper 110. Grind adjustment ring 130 located directly beneath hopper 110 can be configured to rotate to various grind settings, which rotation can be facilitated by way of a user tab 131 that extends from the grind adjustment ring. Grind setting markings 111 can be placed along an outer bottom edge of hopper 110, and these markings can reflect the various grind settings that can be selected by a user. Rotating grind adjustment ring 130 in one direction can increasingly lower the grind setting, while rotating the grind adjustment ring in the other direction can increasingly raise the grind setting for conical burr coffee grinder 100.

In a particular example, conical burr coffee grinder 100 can have 41 different distinct grind settings that can be selected by grind adjustment ring 130. These can range from a finest setting at "1" to the far left of rotational motion for grind adjustment ring 130 (and corresponding grind setting markings 111) to a coarsest setting of "11" to the far right of rotational motion for the grind adjustment ring (and the corresponding grind setting markings). As shown, three distinct grind settings can exist as marked between each designated number along grind setting markings 111. In various embodiments, the finest setting at "1" can reflect a grind size of about 200 microns in diameter while the coarsest setting at "11" can reflect a grind size of about 1200 microns in diameter for the ground coffee particles. Other grind sizes are also possible. Each of the different grind settings can result in a different spatial relationship between the inner and outer conical burrs within conical burr coffee grinder 100, as detailed below.

Continuing with FIG. 8A, the conical burr coffee grinder of FIG. 1 is shown in top perspective view with its hopper lid removed. Various components of conical burr coffee grinder 100 can be seen from this alternative perspective, such as hopper 110, grind adjustment ring 130, grind chamber housing 102, and removable multipurpose container 140. With the hopper lid removed, various visible components of hopper 110 can include circular sidewall 112, downward sloping floor 113, and opening 114 beneath hopper umbrella 115, which can optionally be removable from a hopper umbrella support in some arrangements.

FIGS. 8B and 8C depict an example removable hopper lid for a conical burr coffee grinder in side perspective and bottom perspective views respectively. Hopper lid 120, which can be removable from the conical burr coffee grinder hopper, can include a roof 121 and a circular sidewall 122, which can be connected to the roof such that a roof protrusion 123 can extend around the outer circumference of the roof. Such an arrangement can facilitate circular sidewall 122 being located inside and adjacent to the circular sidewall of the hopper when hopper lid 120 is installed within the hopper, with roof protrusion 123 then resting at the top of the circular sidewall of the hopper.

One or more internal walls 124 within hopper lid 120 can form multiple discrete dosing regions 125, 126 within the hopper lid to facilitate the ready measurement of different amounts of coffee beans to be loaded into the hopper. Internal wall(s) 124 can be shorter than the size of circular sidewall 122 in order to define such dosing regions. For example, dosing region 125 can be sized such that coffee beans filling this dosing region can result in a grind batch suitable for one cup of coffee, while dosing region 126 can be sized such that coffee beans filling this dosing region can result in a grind batch suitable for two cups of coffee. The internal wall 124 illustrated in FIG. 8C can be of an exact height to result in such dosing region volumes. In this example, coffee beans filling dosing regions 125 and 126 can then result in a grind batch suitable for three cups of coffee. Other sizes and locations for additional internal walls can also be used to form other sizes and types of discrete dosing regions within hopper lid 120. In some embodiments, filling the entire hopper lid 120 with coffee beans can then result in a dosing size that can result in a grind batch suitable for twelve cups of coffee.

Figure 9:
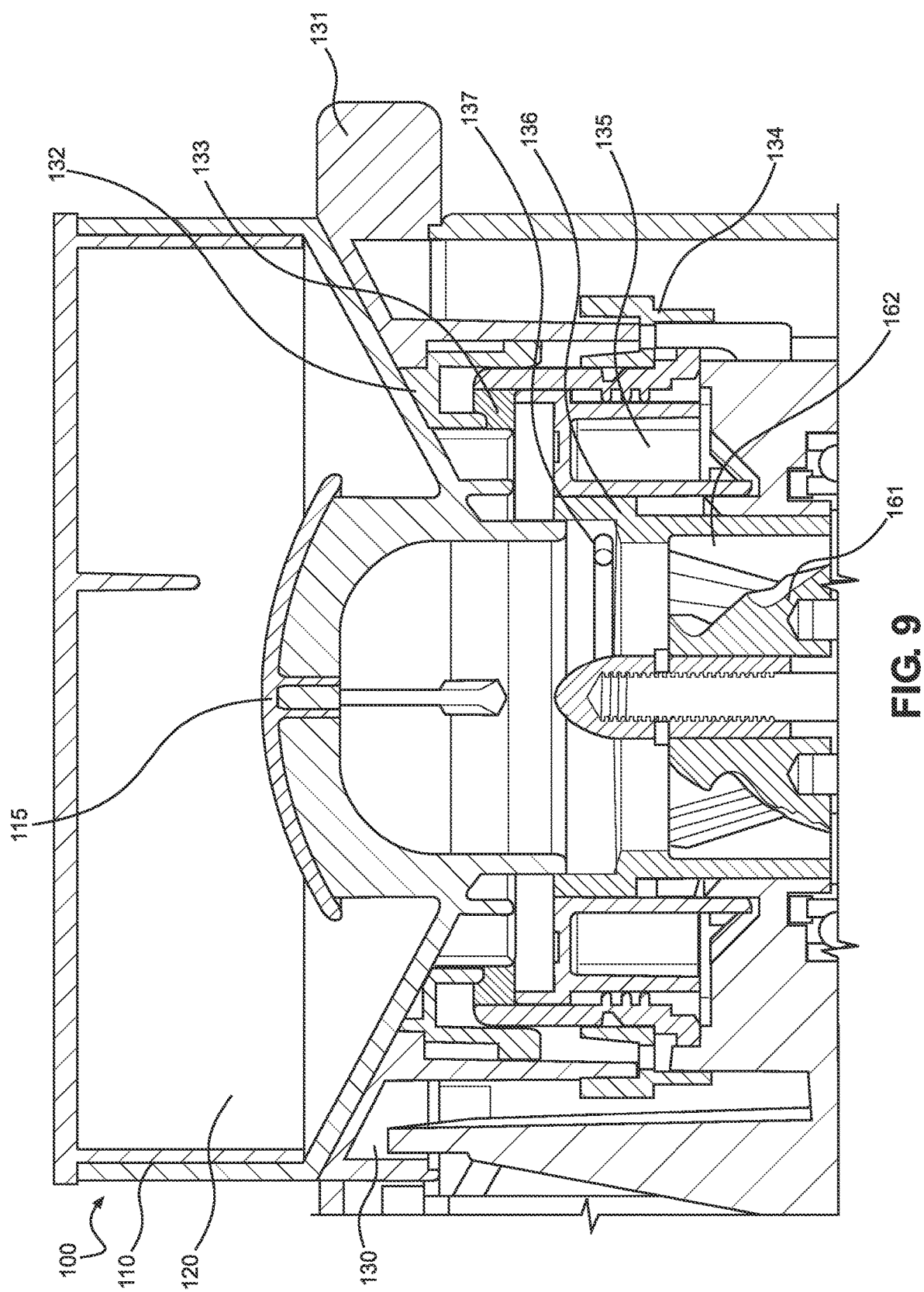
FIG. 9 illustrates in side cross-section view an example hopper and grind adjustment region for a conical burr coffee grinder according to one embodiment of the present disclosure.
Figure 10A:
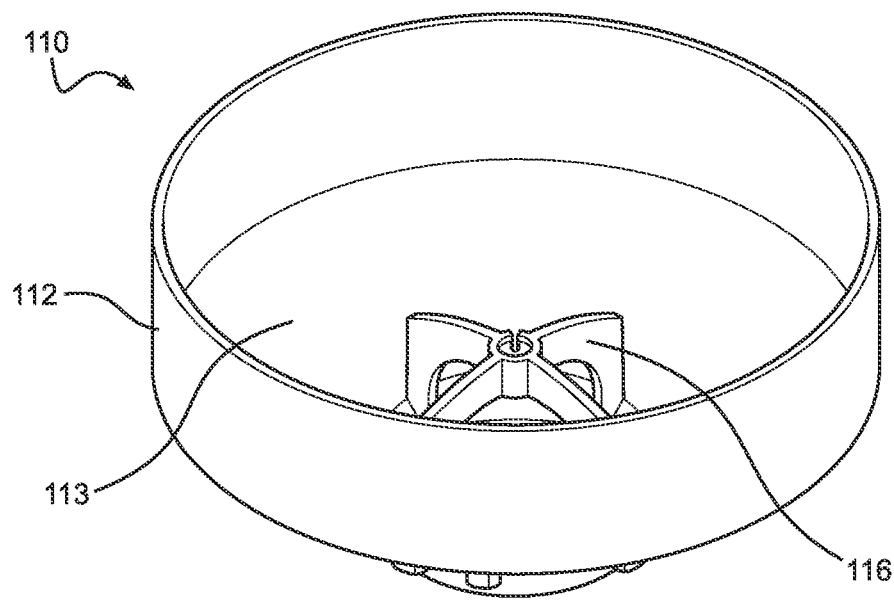
FIG. 10A illustrates in front perspective view an example hopper for a conical burr coffee grinder according to one embodiment of the present disclosure.
Figure 10B:
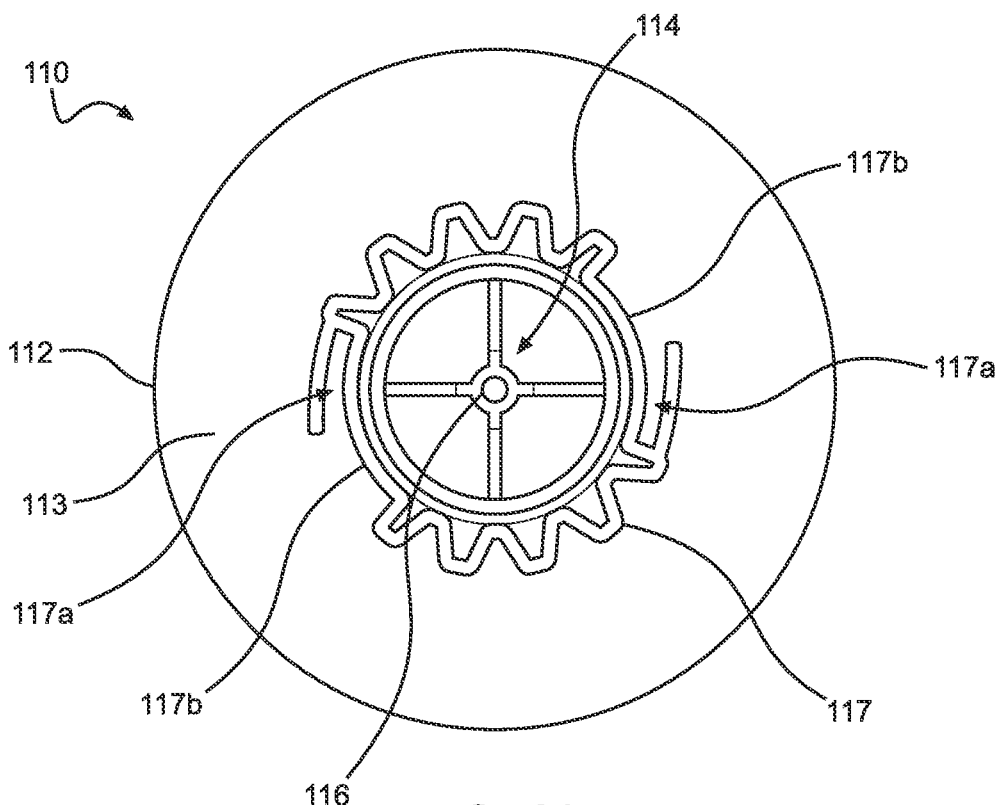
FIG. 10B illustrates in bottom plan view the hopper of FIG. 10A according to one embodiment of the present disclosure.
Figure 10C:
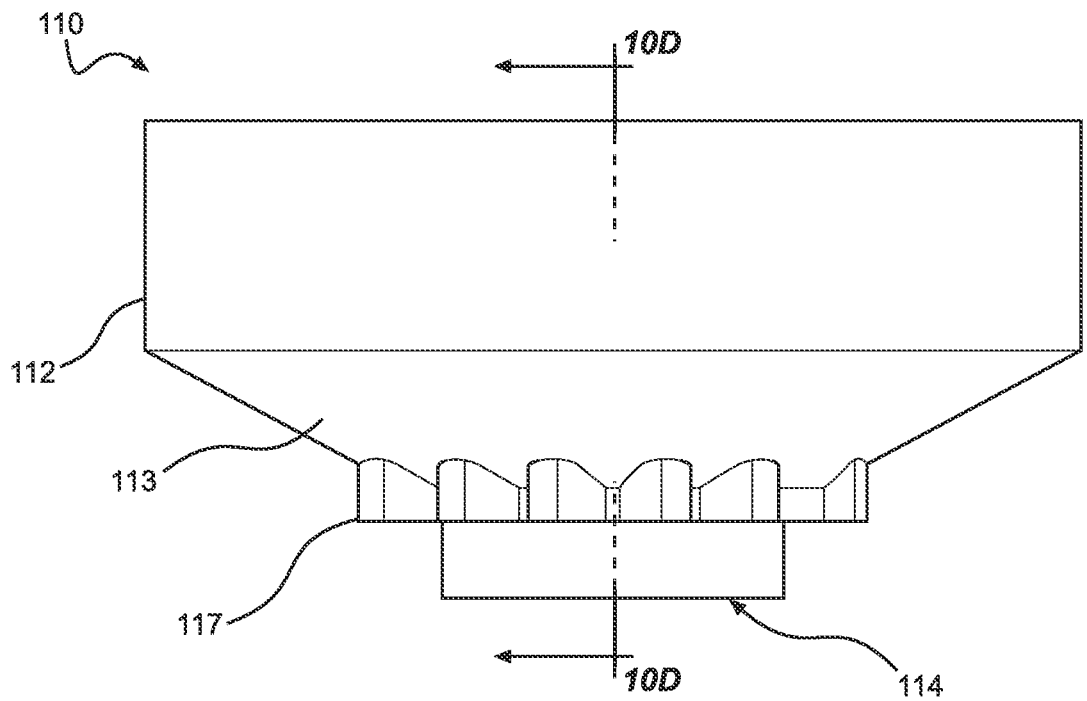
FIG. 10C illustrates in side elevation view the hopper of FIG. 10A according to one embodiment of the present disclosure.
Figure 10D:
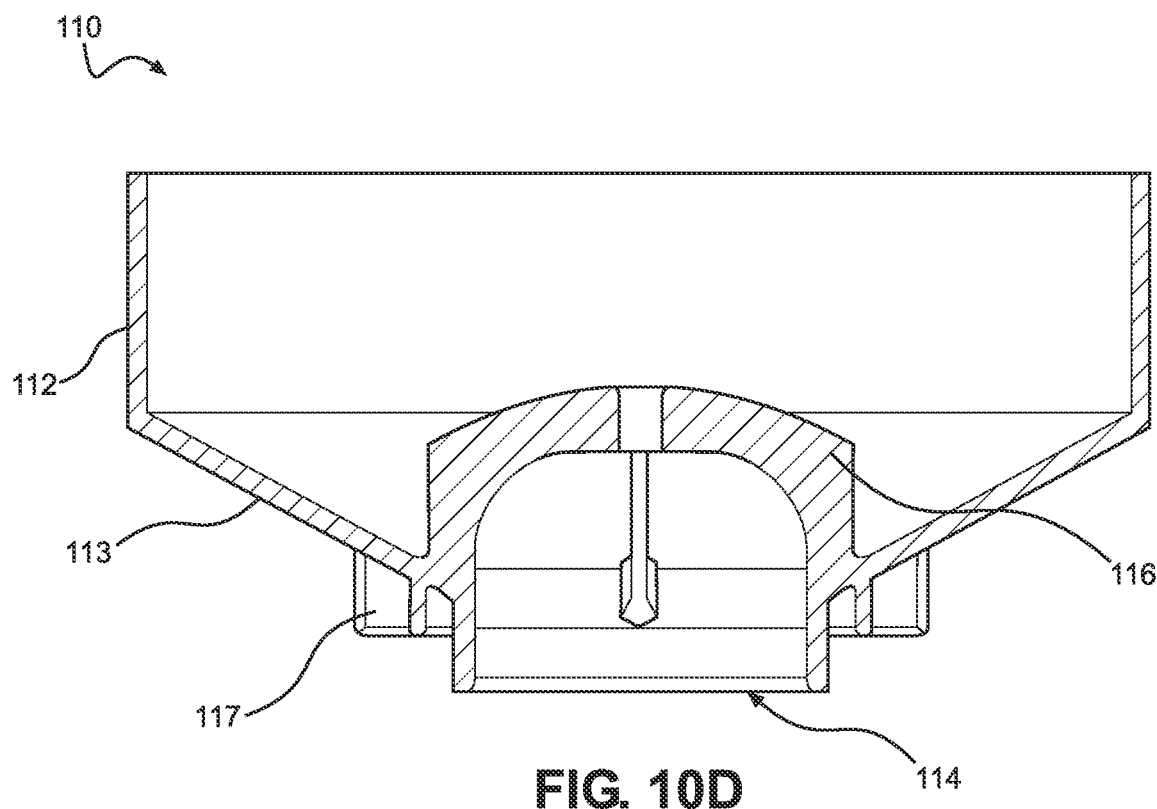
FIG. 10D illustrates in side cross-section view the hopper of FIG. 10A according to one embodiment of the present disclosure.

Moving next to FIG. 9, an example hopper and grind adjustment region for a conical burr coffee grinder is illustrated in side cross-section view. A hopper subassembly can include, for example, hopper 110, hopper lid 120, and hopper umbrella 115, each of which can be removable from overall conical burr coffee grinder 100. A grind adjustment subassembly can include, for example, grind adjustment ring 130 including user tab 131, calibration ring 132, internal adjustment ring 133, calibration spring retainer 134 including multiple calibration springs (not shown), inner conical burr 161, outer conical burr 162, outer conical burr carrier 135, outer conical burr overmold 136, and burr overmold wire 137, among other possible items.

As noted above, inner conical burr 161 can rotate in place while outer conical burr 162 remains stationary during operation of conical burr coffee grinder 100. The vertical spacing between inner conical burr 161 and outer conical burr 162 can determine the grind size for a given batch of coffee grinding. Adjusting this vertical spacing can involve raising or lowering outer conical burr 162 vertically with respect to inner conical burr 161, and this be accomplished using these grind adjustment subassembly components. Outer conical burr overmold 136 can be formed around the outside of outer conical burr 162 such that these items form a combined unit that moves together. While outer conical burr 162 (and inner conical burr 161) can be formed of steel or another suitable metal, for example, outer conical burr overmold 136 can be formed of a suitably rigid thermoplastic material. Outer conical burr overmold 136 can be rotationally locked into and unlocked from outer conical burr carrier 135, which can also be formed from a suitably rigid thermoplastic material. When outer conical burr overmold 136 is locked into outer conical burr carrier 135, any vertical (i.e., up or down) movement of the outer conical burr carrier can then result in the same vertical movement of the outer conical burr overmold and thus outer conical burr 162.

Vertical up and down movement of outer conical burr carrier 135 can be achieved by way of internal adjustment ring 133, calibration spring retainer 134, calibration springs, and other internal features as noted below. These intermediary components can function to translate rotational movement of the externally located grind adjustment ring 130 or rotational movement of the internally located calibration ring 132 into vertical up and down movement of the outer conical burr carrier 135 and thus outer conical burr 162. Grind adjustment ring 130 can be a first mode of user input to adjust grind size, and calibration ring 132 can be a second mode of user input to adjust grind size. While grind adjustment ring 130 is readily accessible to a user at the outside of conical burr coffee grinder 100, calibration ring 132 can be accessible to the user by removing the hopper subassembly (i.e., hopper 110, hopper lid 120, and hopper umbrella 115).

Continuing with FIGS. 10A-10D, a hopper for a conical burr coffee grinder is shown in front perspective, bottom plan, side elevation, and side cross-section views respectively. Hopper 110, which can be removable from a conical burr coffee grinder, can include a circular sidewall 112, downward sloping floor 113, bottom opening 114, and umbrella support 116 for a removable hopper umbrella (not shown). In some arrangements, bottom opening 114 can include a protruding extension at the center of downward sloping floor 113, as shown. Hopper 110 can also include a ribbed reinforcement arrangement 117 around bottom opening 114 and extending downward from downward sloping floor 113, which reinforcement arrangement can provide structural rigidity and be integrally formed or attached to the hopper. Reinforcement arrangement 117 can include multiple slots 117a and slot access openings 117b formed therein to facilitate the ready installation and removal of hopper 110 to and from the conical burr coffee grinder. For example, slots 117a and slot access openings 117b can facilitate a rotational attachment to and removal from hopper support posts that extend upward from within the conical burr coffee grinder, as noted below.

Figure 11A:
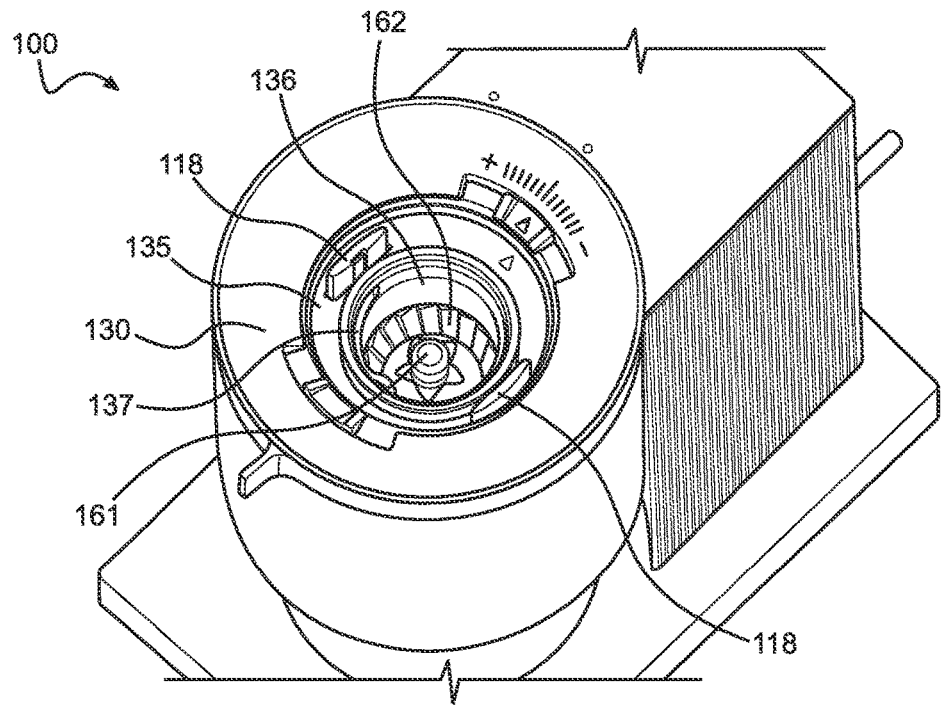
FIG. 11A illustrates in top perspective view the conical burr coffee grinder of FIG. 1 with its hopper lid and hopper removed according to one embodiment of the present disclosure.
Figure 11B:
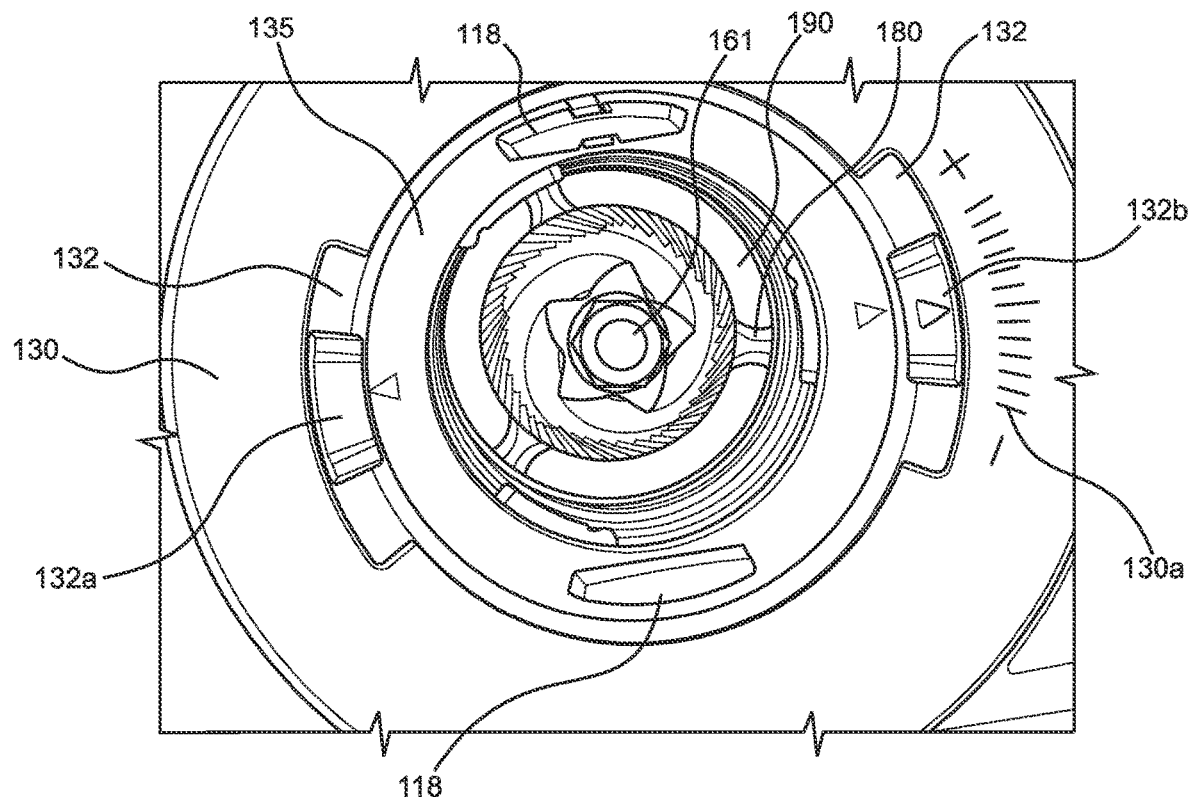
FIG. 11B illustrates in top plan view the conical burr coffee grinder of FIG. 1 with its hopper lid and hopper removed according to one embodiment of the present disclosure.

Moving next to FIGS. 11A and 11B, the conical burr coffee grinder of FIG. 1 is shown with its hopper lid and hopper removed in top perspective and top plan views respectively. Hopper support posts 118, which can be configured to remain stationary, can extend upward through openings in outer conical burr carrier 135. Hopper support posts 118 can function both to support and facilitate installation and removal of the system hopper, and these hopper support posts can also prevent rotation of outer conical burr carrier 135. Rather than allow rotation of outer conical burr carrier 135, hopper support posts 118 can facilitate translating the rotational motions from various user input and intermediary components to the vertical up and down motions of the outer conical burr carrier that then adjust the spacing between the conical burrs.

Again, such rotational user input can adjust the grind setting and can include a first mode made by way of grind adjustment ring 130, a second mode made by way of calibration ring 132, or both. As shown, various portions of calibration ring 132 can be accessed by a user through openings along the top of grind adjustment ring 130 when the hopper is removed from conical burr coffee grinder 100. In some arrangements, calibration ring 132 can be spring loaded such that a user can push down on calibration ring actuation regions 132a and 132b to be able to rotate the calibration ring 132 with respect to the grind adjustment ring 130 to adjust the grind setting of the coffee grinder without using the grind adjustment ring. Calibration ring actuation region 132b can include an indicator that rotates with the calibration ring 132 relative to the grind adjustment ring 130, and this indicator can point to additional grind setting markings 130a along the top surface of the grind adjustment ring.

While grind adjustment ring 130 can have 41 different discrete grind settings, as noted above, calibration ring 132 can have 12 further grind settings, for example, such that the overall conical burr coffee grinder 100 can provide 53 total grind settings. In various arrangements, the extra grind settings of calibration ring 132 can be finer than the grind settings of grind adjustment ring 130, such that partial or fine adjustments between the 41 different discrete grind settings of the grind adjustment ring are possible. These extra 12 grind settings provided by calibration ring 132 can also allow a user to manually go slightly beyond the regular grind range provided by grind adjustment ring 130, which can be, for example, about 200-1200 microns for the diameters of the coffee grounds. This added fine adjustment of the grind settings provided by calibration ring 132 that allow a user to go past the upper and lower setting limits of the grind adjustment ring 130 can be useful, for example, if the finest setting for espresso is not fine enough for the user. This can happen for various reasons, such as, for example, where burrs wear down gradually over time.

As noted above, rotatable inner conical burr 161 can be situated within stationary outer conical burr 162, which in turn is fastened to outer conical burr overmold 136 as a combined unit that is then removably coupled to outer conical burr carrier 135. The combined unit of outer conical burr 162 and outer conical burr overmold 136 can be removed from outer conical burr carrier 135 by rotating the combined unit, such as by about ¼ turn rotation using burr overmold wire 137 coupled to the outer conical burr overmold. The burr overmold wire 137 can then be pulled upward to lift the combined unit of outer conical burr overmold 136 and outer conical burr 162 out of conical burr coffee grinder 100. FIG. 11A depicts the combined unit of outer conical burr overmold 136 and outer conical burr 162 as being installed within the conical burr coffee grinder 100, while FIG. 11B depicts this combined unit as being removed from the conical burr coffee grinder.

As shown in FIG. 11B, removal of this combined unit of outer conical burr overmold 136 and outer conical burr 162 can expose portions of rotor gear 170, which has openings therethrough that expose chute 190 therebeneath. Removal of this combined unit can provide various advantages, such as the ready cleaning or unclogging of one or both conical burrs 161, 162, the replacement of inner conical burr 161, adjusting the relative burr settings, and/or other possible reasons. Inner conical burr 161 can be a standard 5-star shaped 40 mm conical burr, although 6-star and other star shapes and sizes of inner conical burrs can also be used.

Figure 12A:
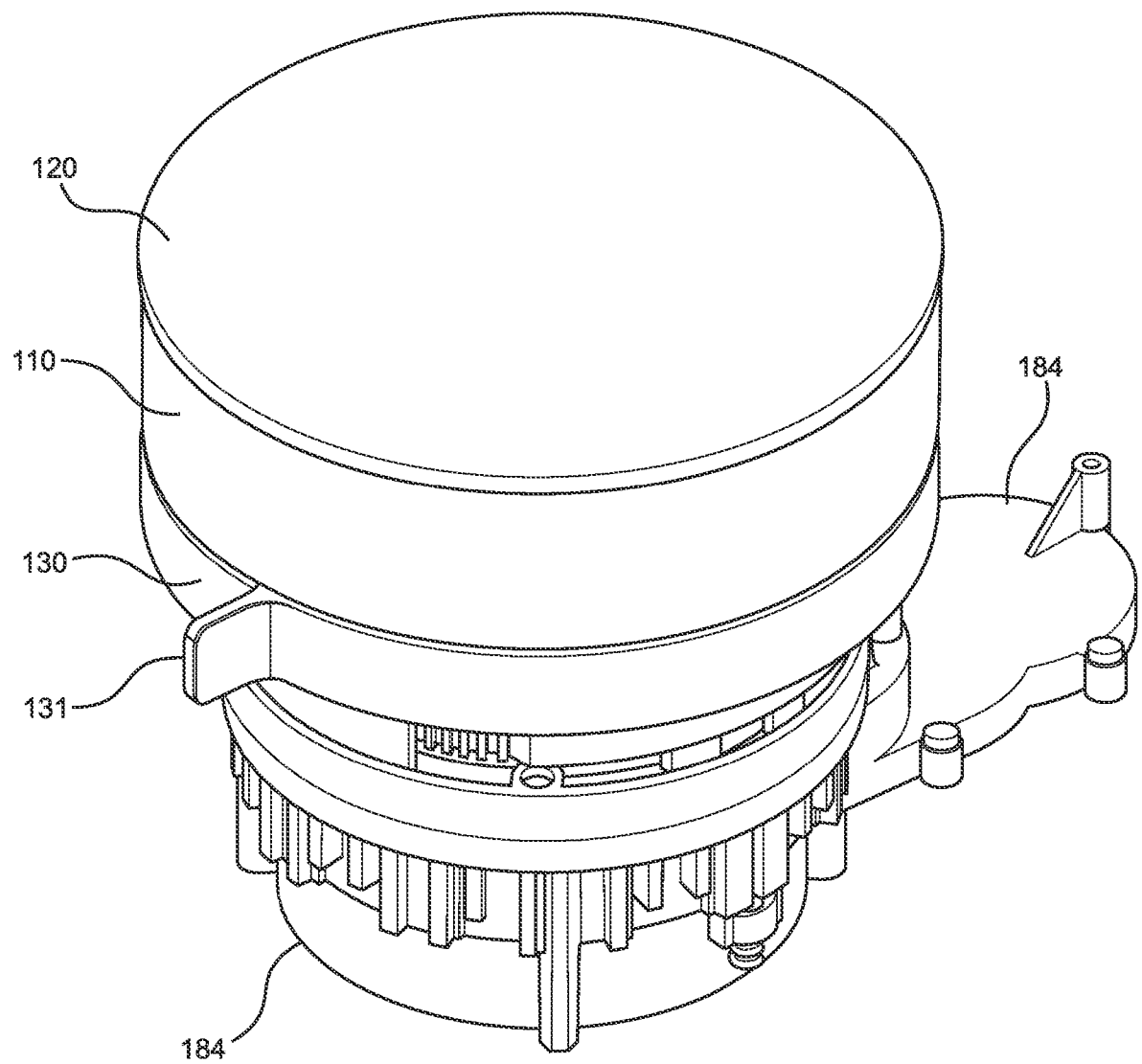
FIG. 12A illustrates in front perspective view example hopper and grind adjustment subassemblies for a conical burr coffee grinder according to one embodiment of the present disclosure.

Turning now to FIG. 12A example hopper and grind adjustment subassemblies for a conical burr coffee grinder are depicted in front perspective view. As noted above, a hopper subassembly can include hopper 110, hopper lid 120, and various internal components. A grind adjustment subassembly can include grind adjustment ring 130 including user tab 131 and various internal components, some or all of which can be contained within an upper gearbox housing 184 that can extend from beneath the grind adjustment subassembly to the rotational motor and that can also contain various geartrain components.

Figure 12B:
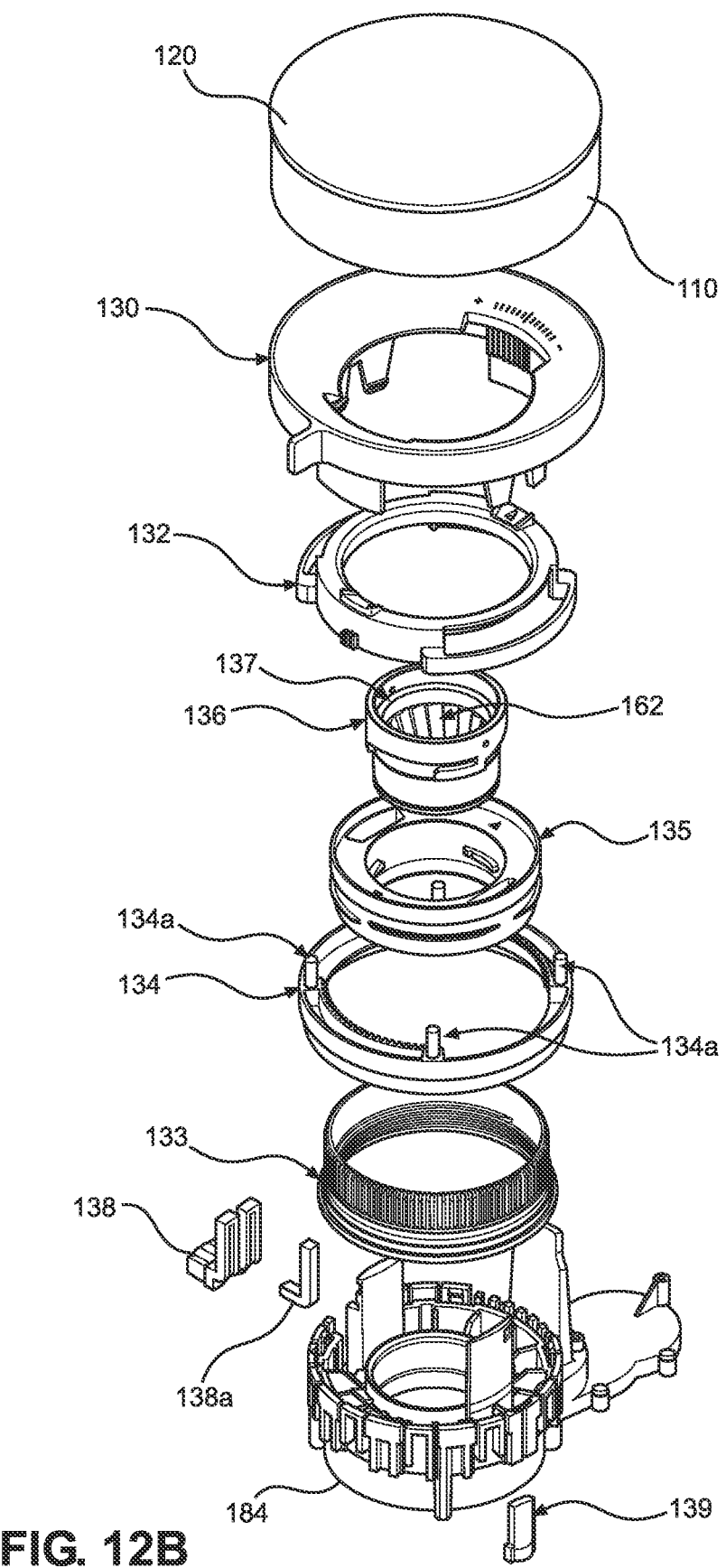
FIG. 12B illustrates in exploded perspective view the hopper and grind adjustment subassemblies of FIG. 12A according to one embodiment of the present disclosure.

Continuing with FIG. 12B the hopper and grind adjustment subassemblies of FIG. 12A are shown in exploded perspective view. After hopper 110 and hopper lid 120, various grind adjustment subassembly component can include, for example, grind adjustment ring 130, calibration ring 132, outer conical burr overmold 136 containing outer conical burr 162 and burr overmold wire 137, outer conical burr carrier 135, calibration spring retainer 134 including multiple calibration springs 134a, internal adjustment ring 133, safety switch 138, safety switch kicker 138a, detent pawl 139, and upper gearbox housing 184, among other possible items.

As noted above, grind adjustment ring 130 and calibration ring 132 can provide separate modes of user input for adjusting the grind setting of the conical burrs by vertically raising or lowering outer conical burr 162. In general, rotational motion by grind adjustment ring 130 or calibration ring 132 can be translated to vertical motion for the combined assembly of outer conical burr carrier 135, outer conical overmold 136, and outer conical burr 162. This can be facilitated by threaded interactions between these components and internal adjustment ring, as well as the inability of outer conical burr carrier 135 to rotate due to stationary hopper support posts extending through openings in the outer conical burr carrier.

Figure 13A:
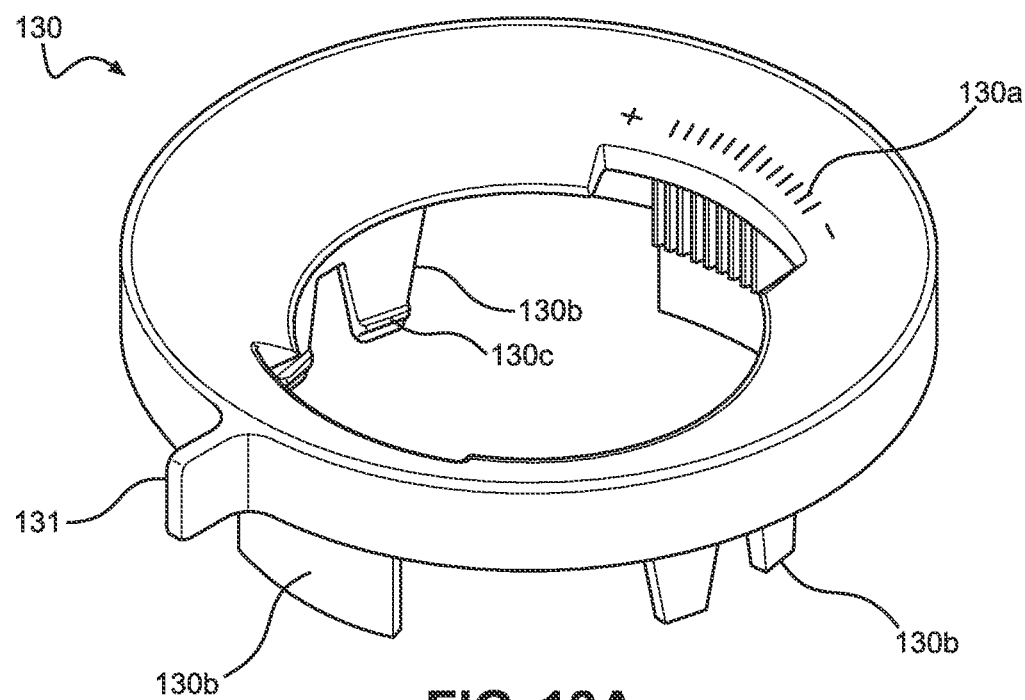
FIG. 13A illustrates in front perspective view an example grind adjustment ring for a conical burr coffee grinder according to one embodiment of the present disclosure.
Figure 13B:
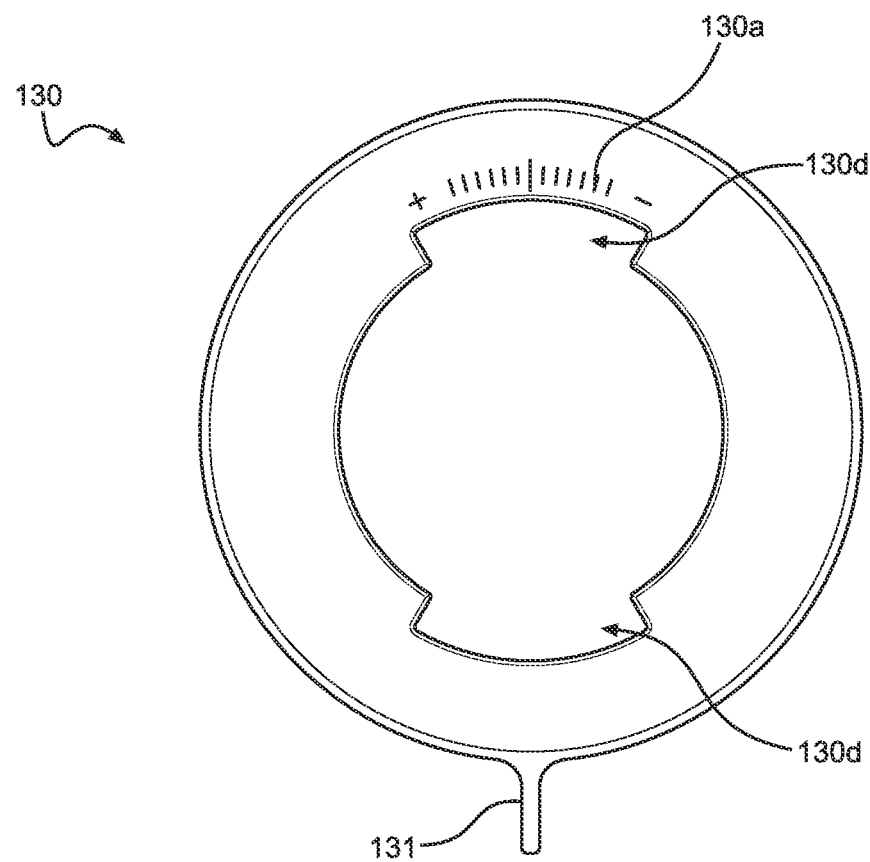
FIG. 13B illustrates in top plan view the grind adjustment ring of FIG. 13A according to one embodiment of the present disclosure.

Moving next to FIGS. 13A and 13B an example grind adjustment ring for a conical burr coffee grinder is illustrated in front perspective and top plan views respectively. Grind adjustment ring 130 can include user tab 131 for indicating its own grind settings and can also have grind setting markings 130a on an upper surface thereof, with these grind setting markings being usable for a calibration ring located beneath the grind adjustment ring. Multiple tabs 130b can extend downward from grind adjustment ring 130, and these tabs can have one or more protrusions 130c extending inward therefrom. Protrusion(s) 130c can be configured to interact with threads and/or other features along inner and/or outer surfaces of an internal adjustment ring such that rotational motion of grind adjustment ring 130 can be translated to motion in the internal adjustment ring. Multiple openings 130d along the upper surface of grind adjustment ring 130 can facilitate user access to the calibration ring located therebeneath.

In various embodiments, one or more tabs 130b extending downward from grind adjustment ring 130 can interact with one or more upward extending stationary protrusions from a gearbox or other lower system component to provide a mechanical hard stop that limits the amount of rotation of the grind adjustment ring. For example, grind adjustment ring 130 can have a full limit of about 80 degrees of rotation by way of such a mechanical hard stop arrangement. Other amounts of rotation and other rotationally limiting features are also possible.

Figure 14A:
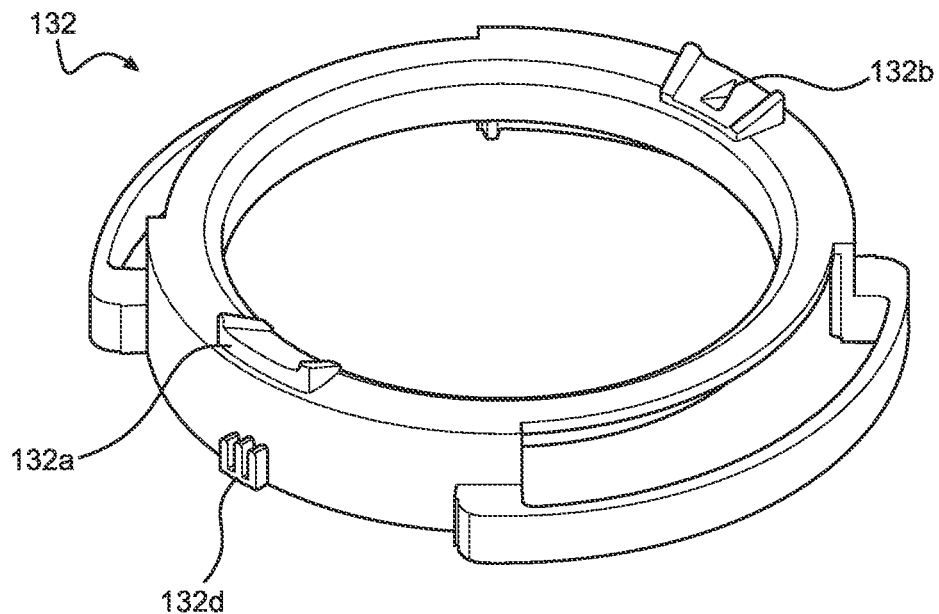
FIG. 14A illustrates in front perspective view an example calibration ring for a conical burr coffee grinder according to one embodiment of the present disclosure.
Figure 14B:
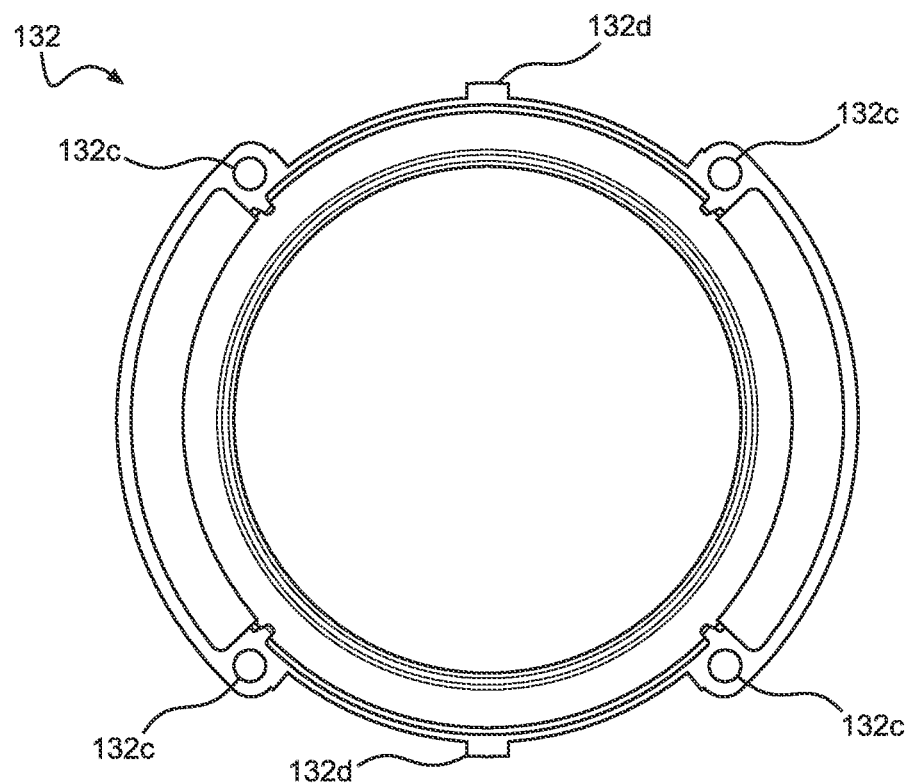
FIG. 14B illustrates in bottom plan view the calibration ring of FIG. 14A according to one embodiment of the present disclosure.

Continuing with FIGS. 14A and 14B an example calibration ring for a conical burr coffee grinder is illustrated in front perspective and bottom plan views respectively. As noted above, calibration ring 132 can be spring loaded such that a user must push down on calibration ring actuation regions 132a and 132b to be able to rotate the calibration ring 132 with respect to the grind adjustment ring. Such rotation of calibration ring 132 can then function to adjust the grind setting of the coffee grinder independently of the grind adjustment ring. Spring loading can occur at spring receptacles 132c distributed about the bottom of calibration ring 132, which spring receptacles can receive springs that default to pushing the calibration ring upward.

Locking features 132d located along the sidewalls of calibration ring 132 can mate with similar features on the grind adjustment ring such that the calibration ring and grind adjustment ring lock and rotate together when spring loading from beneath the calibration ring defaults the calibration ring upward toward the grind adjustment ring. When depressed at calibration ring actuation regions 132a and 132b, locking features 132d disengage with mating features on the grind adjustment ring such that calibration ring 132 can rotate independently. Similar to the grind adjustment ring above, calibration ring 132 can also include features configured to interact with threads and/or other features along inner and/or outer surfaces of an internal adjustment ring, such that rotational motion of grind adjustment ring 130 can be translated to motion in the internal adjustment ring.

Figure 15A:
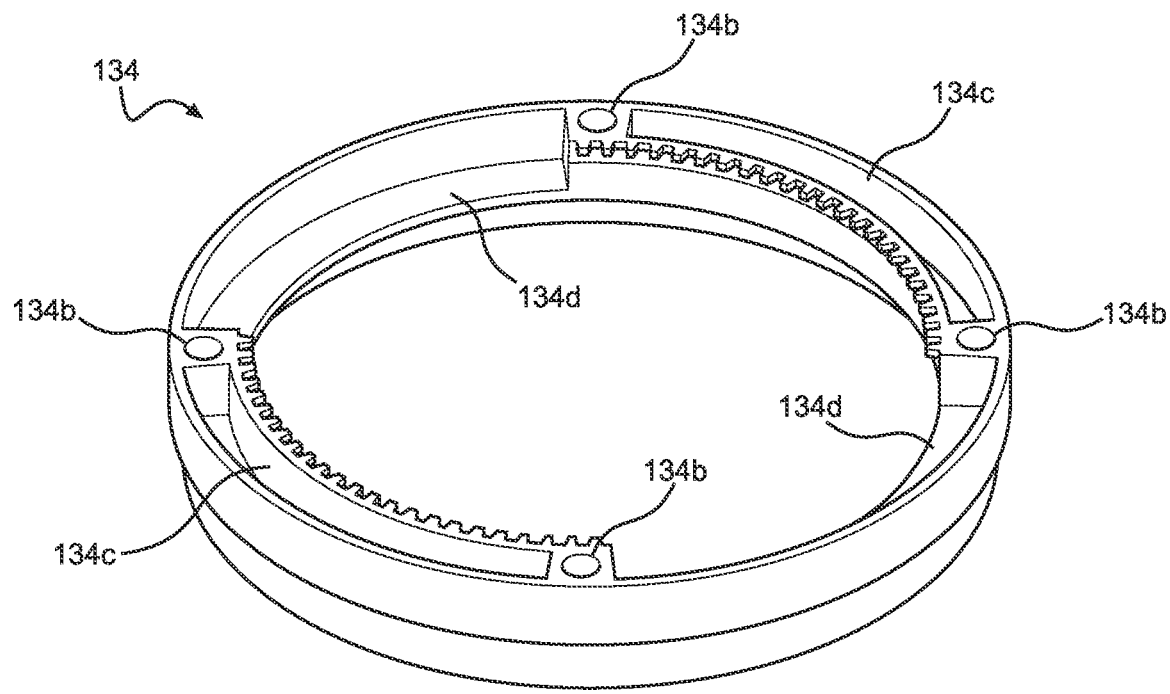
FIG. 15A illustrates in front perspective view an example calibration spring retainer for a conical burr coffee grinder according to one embodiment of the present disclosure.

FIG. 15A illustrates in front perspective view an example calibration spring retainer for a conical burr coffee grinder. Calibration spring retainer 134 can include spring receptacles 134b distributed about its top surfaces of calibration ring 132, which spring receptacles can receive springs that default to pushing upward in order to bias the calibration ring positioned above it. Slotted regions 134c between spring receptacles 134b at the top surface and along the outer circumference of calibration spring retainer 134 and internal ribs 134d between the spring receptacles can simply provide structural stability to calibration spring retainer 134.

Figure 15B:
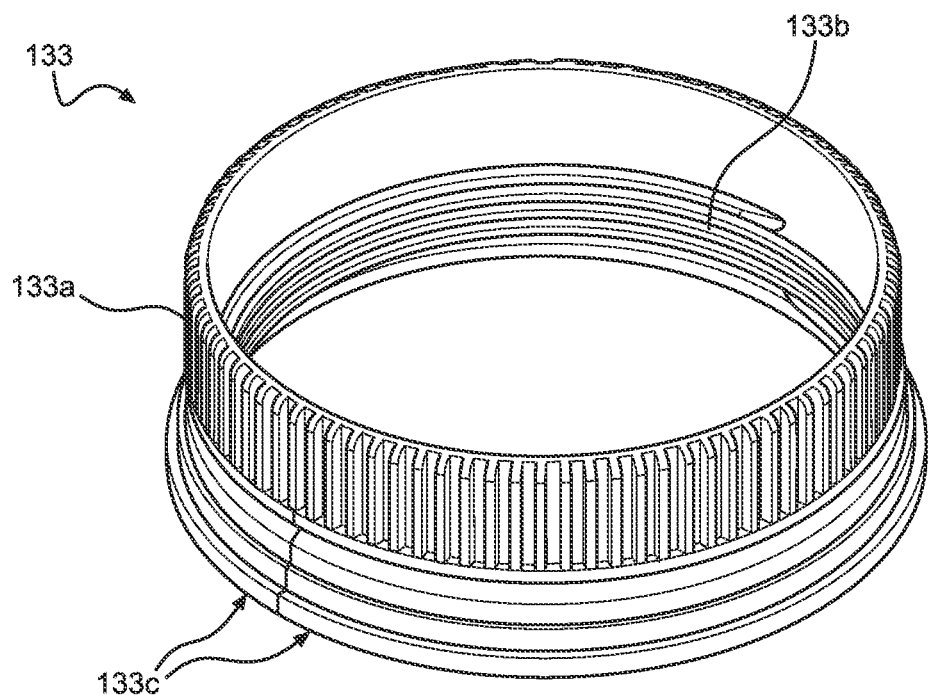
FIG. 15B illustrates in front perspective view an example internal adjustment ring for a conical burr coffee grinder according to one embodiment of the present disclosure.

FIG. 15B illustrates in front perspective view an example internal adjustment ring for a conical burr coffee grinder. Internal adjustment ring 133 can have external grooves 133a along an outer surface, which external grooves can be gripped by a grind adjustment ring, a calibration ring, and/or one or more intermediary components to similarly rotate the internal adjustment ring when the grind adjustment ring and/or calibration ring rotate. Internal adjustment ring 133 can also include internal threads 133b along an inner surface that can be configured to engage with external threads on an outer surface of an outer conical burr carrier. When the outer conical burr carrier is configured such that it cannot rotate, rotational motion of internal adjustment ring 133 then results in its internal threads 133b interacting with the external threads of the outer conical burr carrier to move the outer conical burr carrier vertically up or down.

Internal adjustment ring 133 can also have many detents 133c arranged in series along its bottom circumference to define the grind settings of the conical burr coffee grinder. A spring loaded detent pawl can then be configured to interact with detents 133c to facilitate exact increments of rotational motion for internal adjustment ring 133 by hitting each of these detents on the bottom of the internal adjustment ring as it rotates. The spring loaded detent pawl can effect a clicking into place of the internal adjustment ring 133 at these exact increments of rotational motion, which can then result in the various grind settings of the coffee grinder.

Figure 16A:
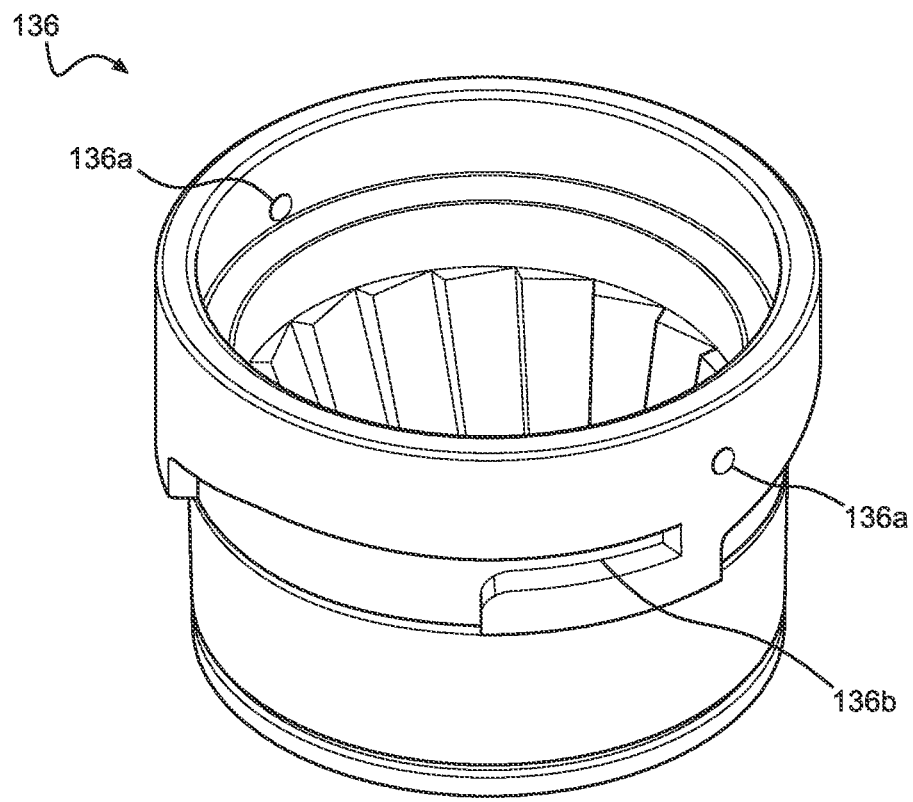
FIG. 16A illustrates in front perspective view an example outer conical burr overmold for a conical burr coffee grinder according to one embodiment of the present disclosure.
Figure 16B:
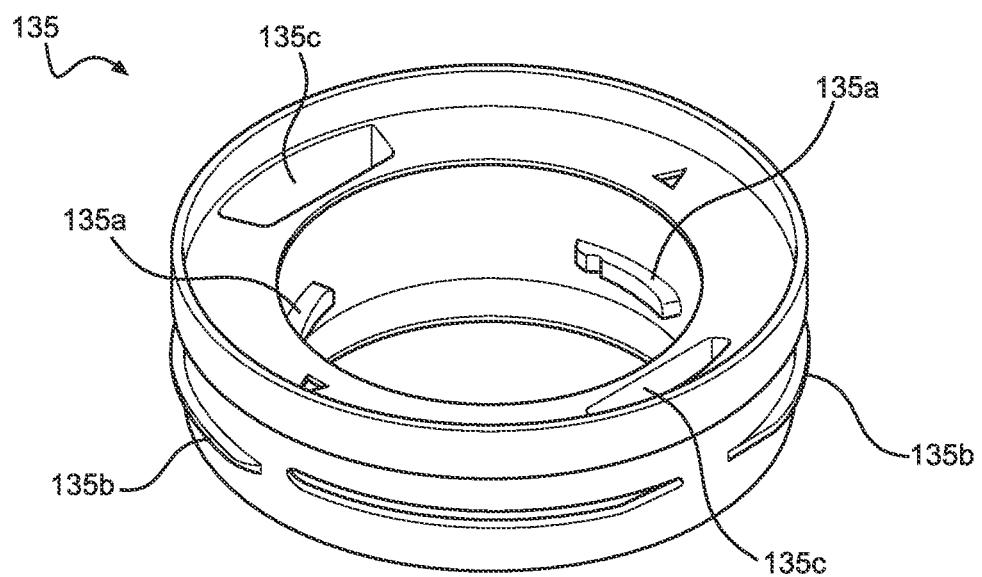
FIG. 16B illustrates in front perspective view an example outer conical burr carrier for a conical burr coffee grinder according to one embodiment of the present disclosure.

FIG. 16A illustrates in front perspective view an example outer conical burr overmold for a conical burr coffee grinder, and FIG. 16B illustrates in front perspective view an example outer conical burr carrier for a conical burr coffee grinder. As noted above, outer conical burr overmold 136 can be formed around outer conical burr 162 such that these items form a combined unit or subassembly that can be moved together vertically and that can be removed together from the conical burr coffee grinder. Outer conical burr overmold 136 can include opposing openings 136a in its upper sidewall for accommodating a burr overmold wire for lifting the outer conical burr overmold and outer conical burr out of the conical burr coffee grinder, as noted above. Outer conical burr overmold 136 can also include multiple horizontal slots 136b formed along the outside of its sidewall for interacting with outer conical burr carrier 135.

Outer conical burr carrier 135 can include multiple horizontal tabs 135a formed along the inside of its sidewall, and these horizontal tabs can mate with horizontal slots 136b on outer conical burr overmold 136 such that the overmold can be twist locked into place within the carrier to form a combined subassembly between the overmold and carrier. Conversely, outer conical burr overmold 136 can be rotated ¼ turn and then pulled upward to be removed from outer conical burr carrier 135.

Outer conical burr carrier 135 can also include multiple thread portions 135b along the outer surface of its sidewall, and these thread portions can be configured to interact with the internal threads 133b of the internal adjustment ring 133 in FIG. 15B above. When the internal adjustment ring is then driven to rotate, the interaction between its internal threads and thread portions 135b can cause outer conical burr carrier 135 to move as well. Because of hopper support posts rising through openings 135c in conical burr carrier 135, however, the conical burr carrier cannot rotate, and instead is moved vertically upward or downward. This vertical movement also moves outer conical burr overmold 136 and outer conical burr 162 vertically, which then alters the spacing between the conical burrs to adjust the grind setting. This can result in an overall vertical travel range of outer burr of about 2 to 2.5 mm, which can correspond to an overall grind range of about 200 to 1200 microns in coffee ground diameter. Of course, other distances, values, and ranges are also possible.

Figure 17:
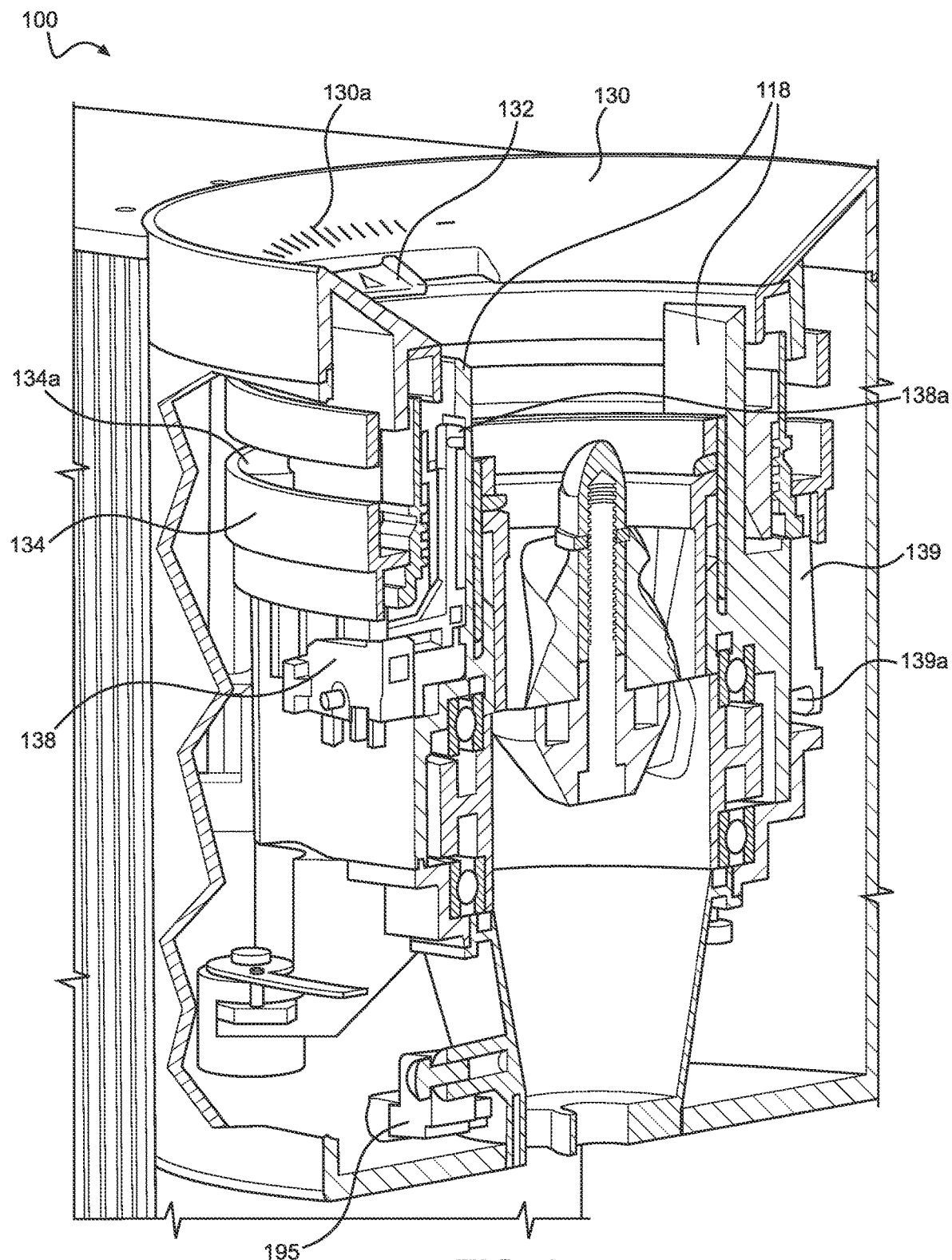
FIG. 17 illustrates in side cutaway and cross-section view an example grind chamber region of a conical burr coffee grinder according to one embodiment of the present disclosure.

Transitioning next to FIG. 17, an example grind chamber region of a conical burr coffee grinder is depicted in side cutaway and cross-section view. Grind chamber and associated items for conical burr coffee grinder 100 can include grind adjustment ring 130, additional grind setting markings 130a, calibration ring 132, calibration springs 134a, calibration spring retainer 134, safety switch 138, ionizer 195, hopper support posts 118, safety switch kicker 138a, detent pawl 139, and detent spring 139a, among other possible components.

Safety switch 138 can be configured to keep conical burr coffee grinder 100 safe when the conical burrs are exposed, such as when the hopper is removed from the coffee grinder. In general, safety switch 138 is configured to detect when the hopper is removed, which exposes the conical burrs, and the inner conical burr is rendered as inoperable when this happens. This can be enabled by preventing power from being supplied to the rotational motor when the hopper is removed or not installed properly, such that the inner conical burr cannot be driven by the rotational motor without the hopper in place. As noted above, the hopper can be installed onto and supported by hopper support posts 118, which can rise up from and be integrally formed with a stable internal component, such as an upper gearbox housing, for example.

Installation of the hopper can be facilitated by way of bayonet or other snap lock features on the back of the hopper support posts 118, with mating features located along the hopper. When installed, a feature located on the hopper can mechanically interact with safety switch kicker 138a to push this kicker downward. When safety switch kicker 138a is pushed downward, this can actuate a closed electrical state within safety switch 138, which state can then allow power to be supplied to the rotational motor to drive the geartrain, rotor gear, and ultimately the inner conical burr. Safety switch kicker 138a can be spring loaded to be biased upward in its default state, such that it releases upward when the hopper is removed. This upward position of safety switch kicker 138a can then register an open electrical state within safety switch 138, which can then prevent power from being supplied to the rotational motor. In some arrangements, safety switch 138 and safety switch kicker 138a can be inaccessible when only the hopper is removed, such that neither of these features can be accessed by a user finger or otherwise manipulated without further disassembly of conical burr coffee grinder 100.

As noted above, detent pawl 139 can function to interact with notches or detents along a bottom surface of the internal adjustment ring. Detent pawl 139 can also be biased upwards by way of a detent spring 139*a*, such that the internal adjustment ring rotates from one grind setting to another in incremental amounts, as facilitated by the interaction of the detent pawl into the internal adjustment ring detents.

Figure 18:
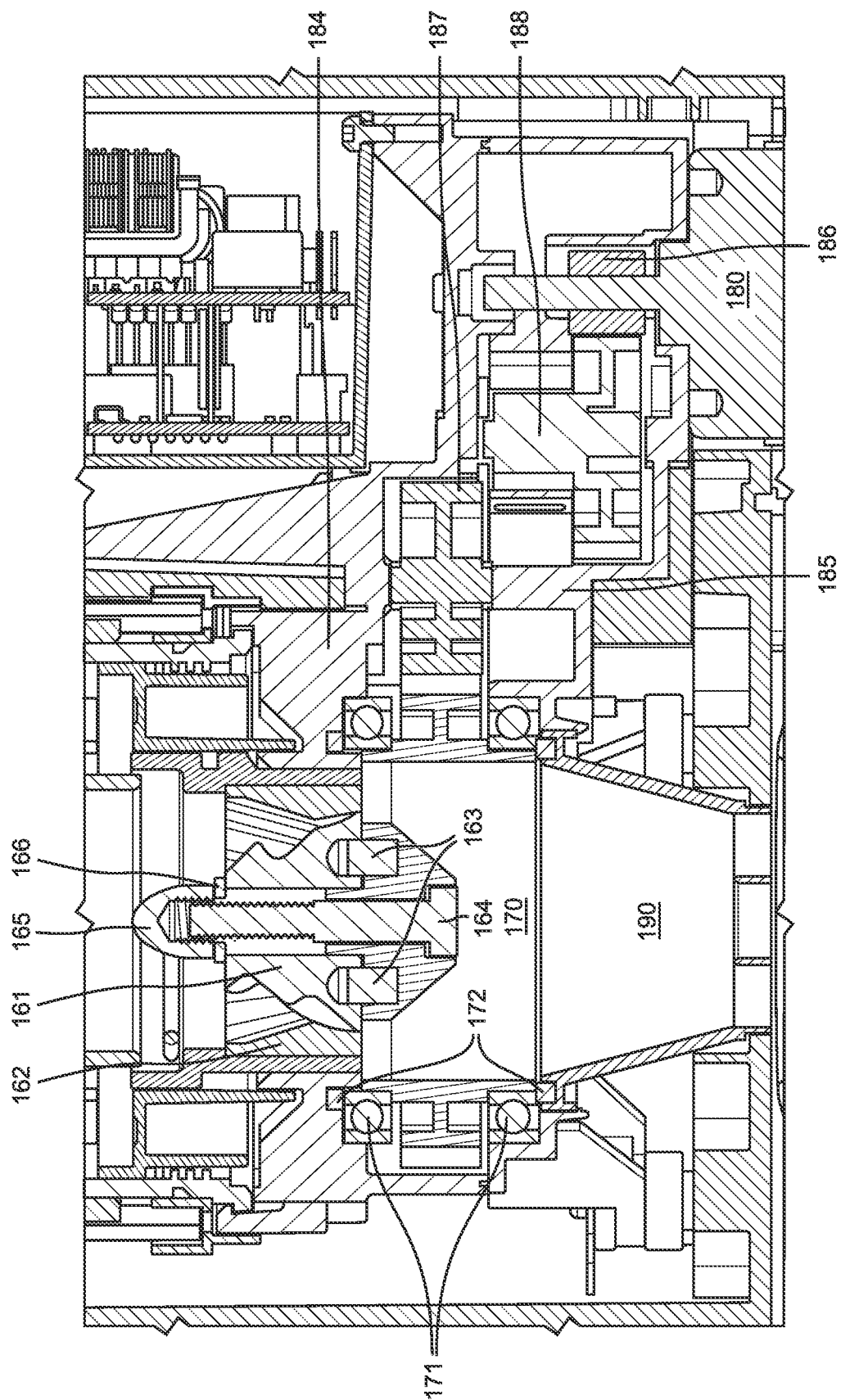
FIG. 18 illustrates in side cross-section view an example grind system for a conical burr coffee grinder according to one embodiment of the present disclosure.
Figure 19A:
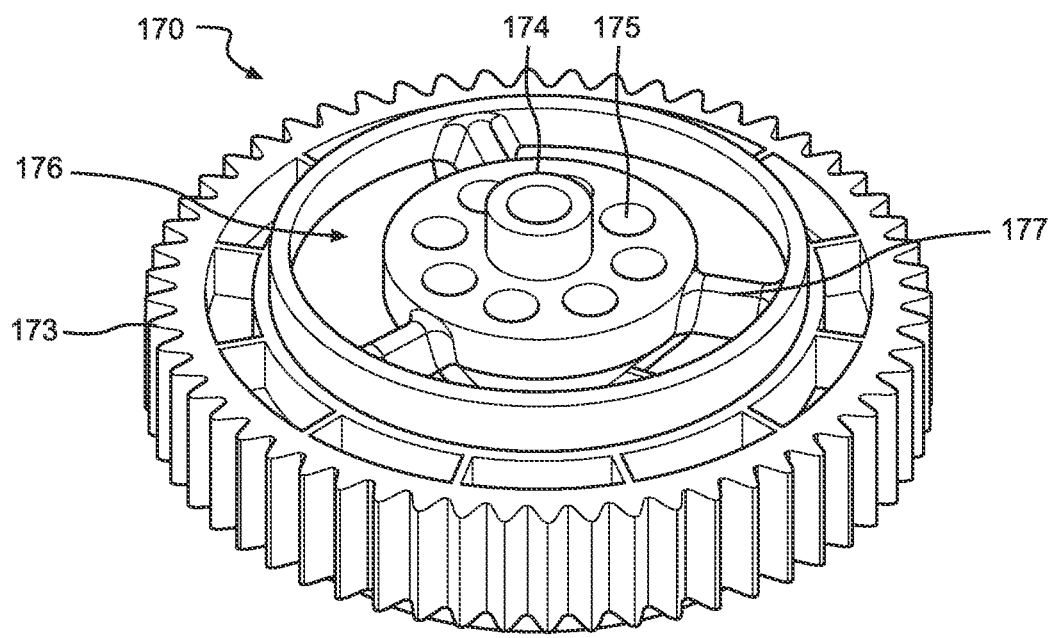
FIG. 19A illustrates in front perspective view an example rotor gear for a conical burr coffee grinder according to one embodiment of the present disclosure.
Figure 19B:
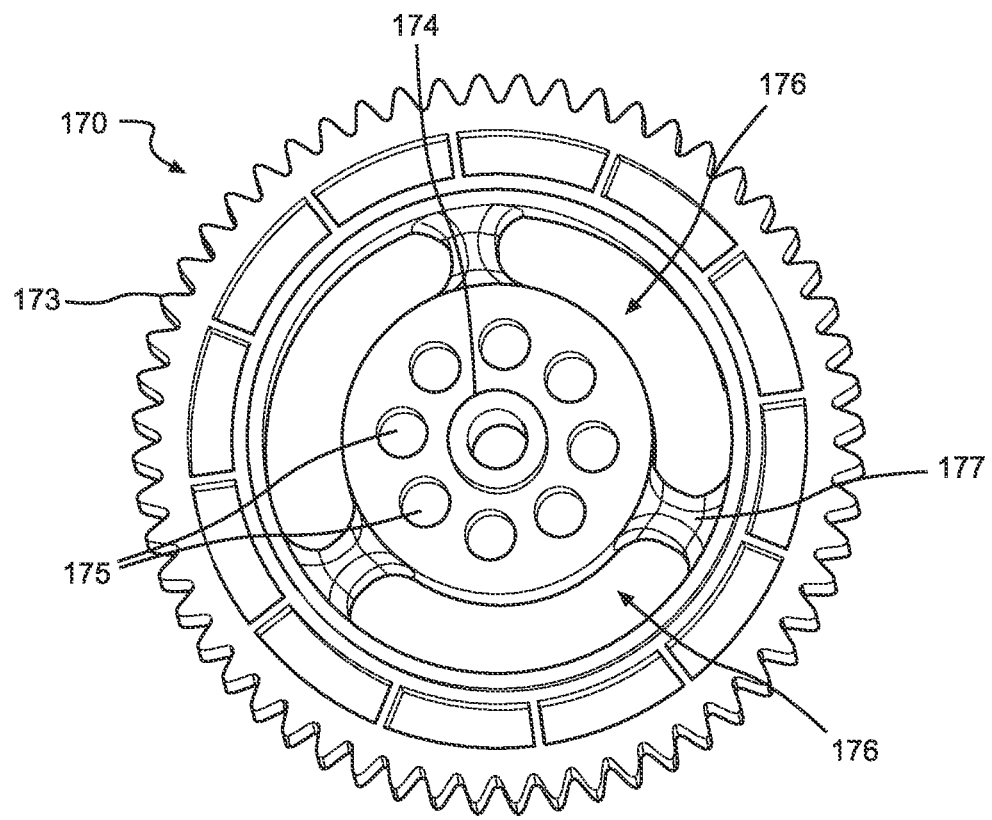
FIG. 19B illustrates in top plan view the rotor gear of FIG. 19A according to one embodiment of the present disclosure.
Figure 19C:
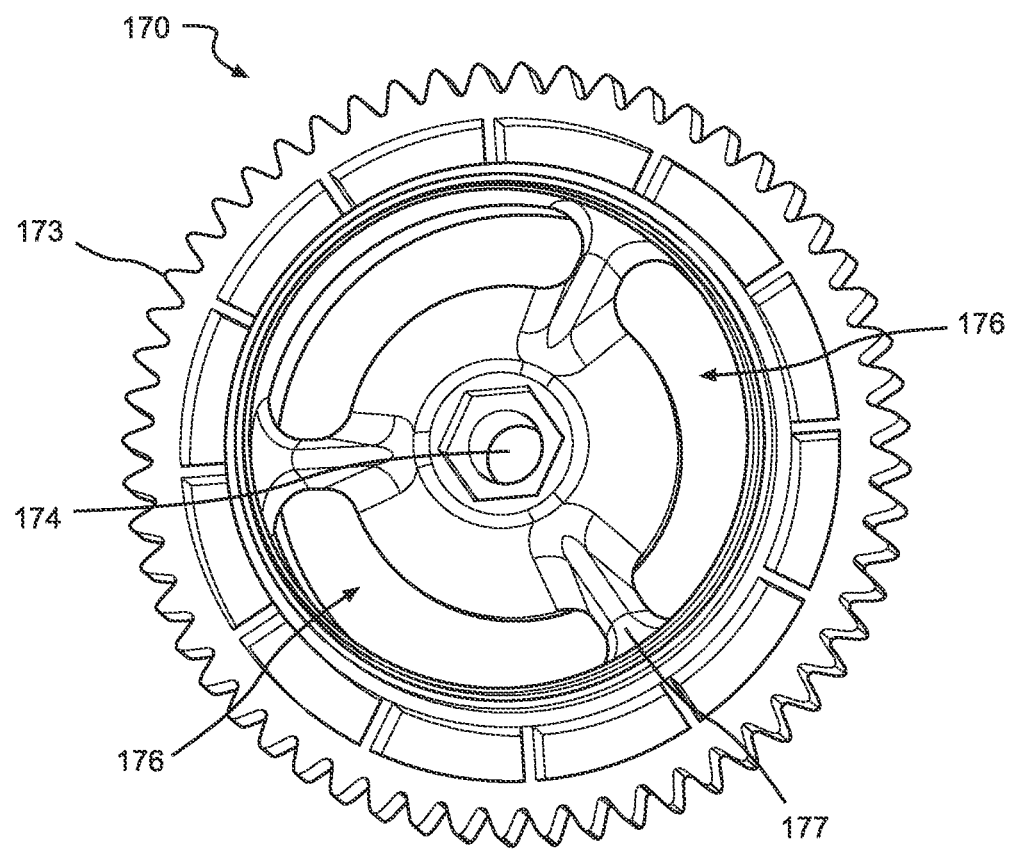
FIG. 19C illustrates in bottom plan view the rotor gear of FIG. 19A according to one embodiment of the present disclosure.
Figure 19D:
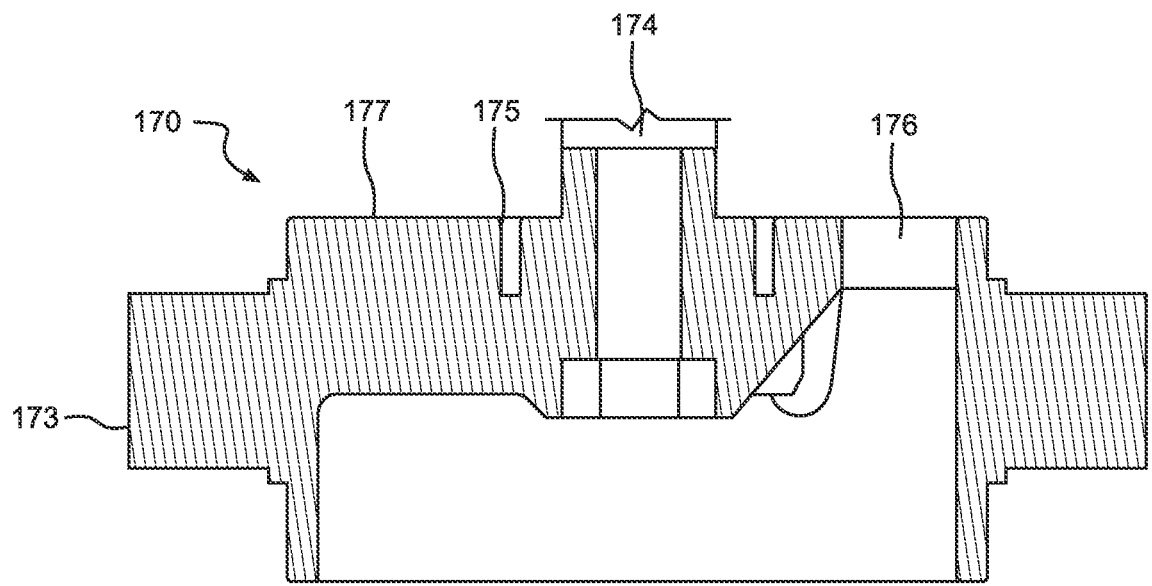
FIG. 19D illustrates in side cross-section view the rotor gear of FIG. 19A according to one embodiment of the present disclosure.

Continuing with FIG. 18, an example grind system for a conical burr coffee grinder is shown in side cross-section view. Such a grind system can include, for example, inner conical burr 161, outer conical burr 162, inner conical burr drive pins 163, inner conical burr bolt 164, nut 165, washer 166, rotor gear 170, rotor gear bearings 171, sealing rings 172, chute 190, upper gearbox housing 184, lower gearbox housing 185, rotational motor 180, pinion gear 186, idler gear 187, and first intermediary gear 188, among other possible components and features. As shown, inner conical burr 161 can be fixed in place against rotational motor 180 by way of inner conical burr drive pins 163, inner conical burr bolt 164, nut 165, and washer 166. Inner conical burr drive pins 163 can extend into corresponding recesses in both inner conical burr 161 and rotor gear 170, inner conical burr bolt 164 can similarly extend through corresponding central recesses in the burr and gear, and these items can affix the burr and gear together so that they can be rotationally driven as a combined unit.

As will be readily appreciated, nut 165 and washer 166 can be removed in order to remove the inner conical burr 161, such as for a thorough cleaning or to replace the burr with new or premium burr sets, for example. In some arrangements, the conical burrs 161, 162, fasteners, springs, washers, and other various components can be formed from steel or another suitably hard material, and most or all of the other components of the disclosed conical burr coffee grinder can be formed of hard thermoplastic or other suitable materials, which can result in lower costs of construction and lower pricing points for the final product. As will also be appreciated, rotor gear bearings 171 and sealing rings 172 can be strategically placed within the gearbox housings and can function to provide a smooth rotational operation of rotor gear 170.

As is generally well known, many existing rotating burr coffee grinders operate their moving burrs on a shaft inside of a gearbox such that there is no direct access to a container or other collection cup below the grinding arrangement for the produced coffee grounds. This can result in impeller style grinding architectures and the need to sweep coffee grounds to the side or in some horizontal direction to be able to then catch or collect the fresh coffee grounds into a container for use. These designs can then typically result in extended coffee grounds processing paths, which increase residue, waste, messes, and cross-contamination of different types of coffee grounds from batch to ground batch. Unlike such known styles of processing coffee grounds within a coffee grinder, the disclosed conical burr coffee grinder utilizes a substantially vertical processing path for its coffee grounds, which vertical path can be facilitated by way of a rotor gear that drives the inner conical burr and that also has openings therethrough to pass the coffee grounds on a vertical path directly from the grinding burrs to a container below.

Moving next to FIGS. 19A-19D, an example rotor gear for a conical burr coffee grinder is illustrated in front perspective, top plan, bottom plan, and side cross-section views respectively. Rotor gear 170 can include teeth 173 around its outer circumference to facilitate being driven by an end gear of an associated geartrain. Rotor gear 170 can also include a bolt recess 174 at its center sized and shaped to hold an inner conical burr bolt and multiple pin recesses 175 around the bolt recess that are sized and shaped to hold multiple inner conical burr pins, with all of these recesses being configured to facilitate fastening an inner conical burr at the center top surface of the rotor gear, as noted and illustrated above.

Rotor gear 170 can also include one or more vertical openings 176 between its center and its outer circumference, and such vertical openings can extend from its top surface to its bottom surface therethrough. Where vertical openings 176 are sufficiently large, this can result in the creation of spokes 177 that connect an inner region of rotor gear 170 proximate its center to an outer region of the rotor gear proximate its circumference. Such spokes 177 can serve to facilitate the drive of the inner conical burr gear coupled to the inner region of rotor gear 170 from the drive input applied to the rotor gear at its outer circumference. In some arrangements, spokes 177 may extend only partway down the thickness of rotor gear 170 to reduce the amount of surface area of the rotor gear, which can lower the amount of waste and contamination of coffee ground dust clinging to surfaces, for example.

Since rotor gear 170 is located directly below inner conical burr 161 and outer conical burr 162, coffee grounds produced by this conical burr arrangement can then flow vertically straight through vertical openings 176 in the rotor gear and into the chute located directly below the rotor gear, even as the rotor gear is rotating at about 300-350 RPM. As will be readily appreciated, this vertical passage through rotor gear 170 then results in a significantly shorter and simpler processing path for the coffee grounds, which can result in less waste and buildup of coffee grounds and dust within the overall coffee grinder, among other advantages.

Figure 20A:
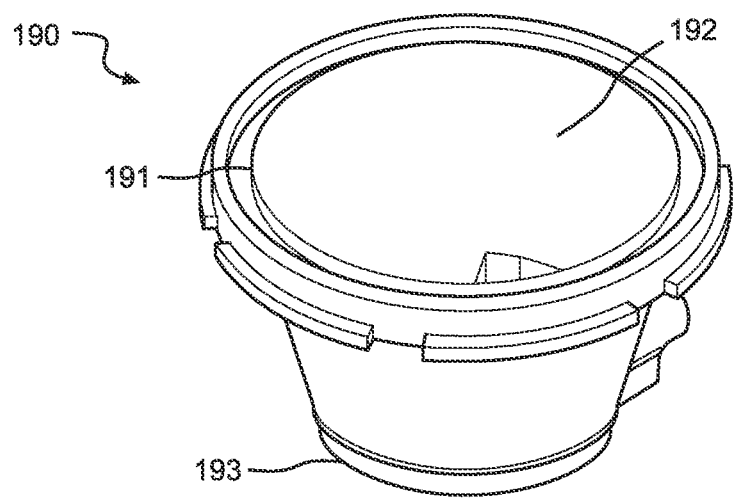
FIG. 20A illustrates in front perspective view an example chute for a conical burr coffee grinder according to one embodiment of the present disclosure.
Figure 20B:
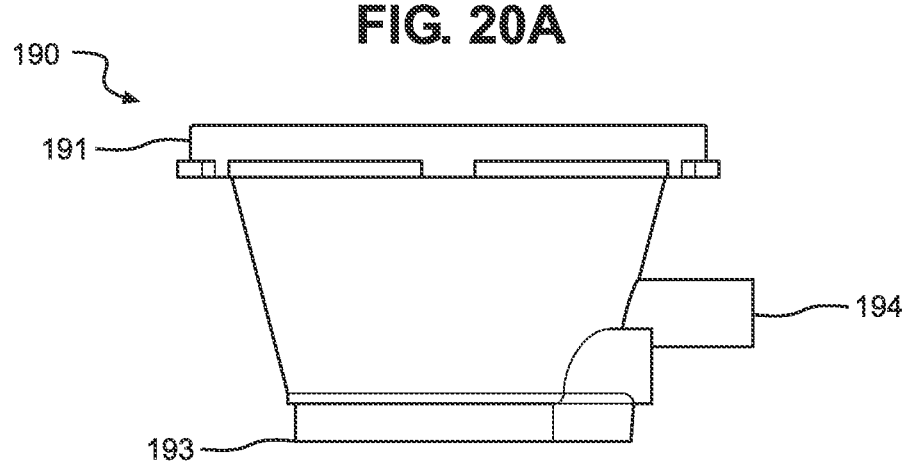
FIG. 20B illustrates in side elevation view the chute of FIG. 20A according to one embodiment of the present disclosure.
Figure 20C:
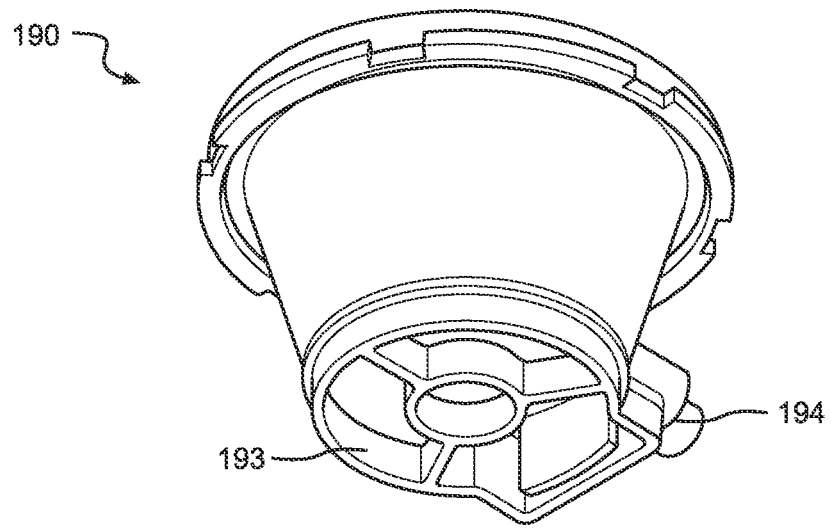
FIG. 20C illustrates in bottom perspective view the chute of FIG. 20A according to one embodiment of the present disclosure.

FIGS. 20A-20C illustrate an example chute for a conical burr coffee grinder in front perspective, side elevation, and bottom perspective views respectively. Chute 190 can be located directly beneath the rotor gear within the conical burr coffee grinder and can be located directly above the removable multipurpose container when the container aligned in its proper location beneath the coffee grinder. As such, chute 190 can direct coffee grounds along a vertical path from the rotor gear above it into the container below it and can have a funnel or conical type shape to facilitate this process.

Chute 190 can have an upper opening 191, an inner volume 192, and a lower opening 194, and can be configured to receive coffee grounds through the upper opening from the rotor gear, pass the coffee grounds through the inner volume, and direct the coffee grounds through the lower opening, which can the pass the coffee grounds into a container below it. In some arrangements, chute 190 can be of a size and shape that promotes smooth or even laminar air and coffee grounds flow to allow the smooth passage of coffee grounds. Such smooth or laminar air flow can serve to reduce or eliminate messes or wasted coffee grinds. Chute 190 can also have an ionizer interface 194 located along a sidewall or back region, such that an ionizer can be interfaced with and supported by the chute.

Figure 21A:
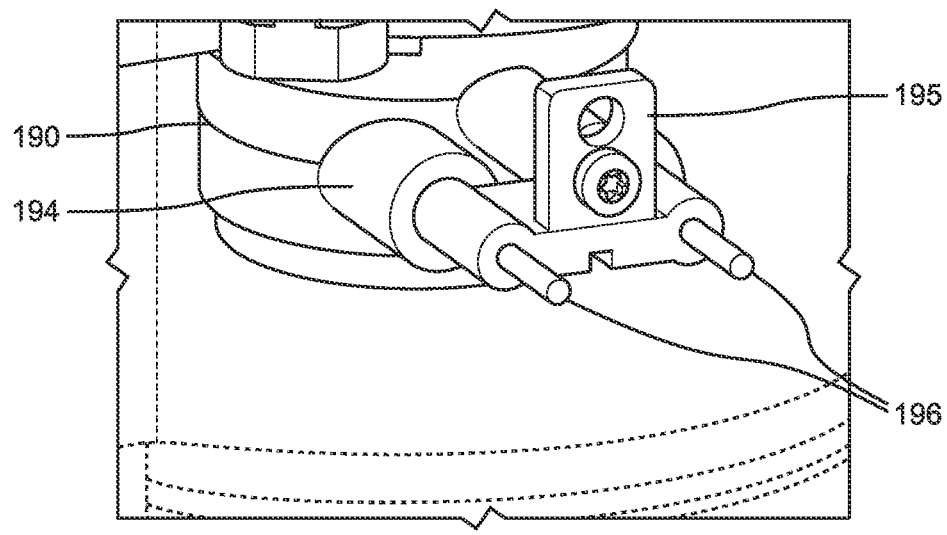
FIG. 21A illustrates in rear perspective view an example ionizer installed at a chute for a conical burr coffee grinder according to one embodiment of the present disclosure.
Figure 21B:
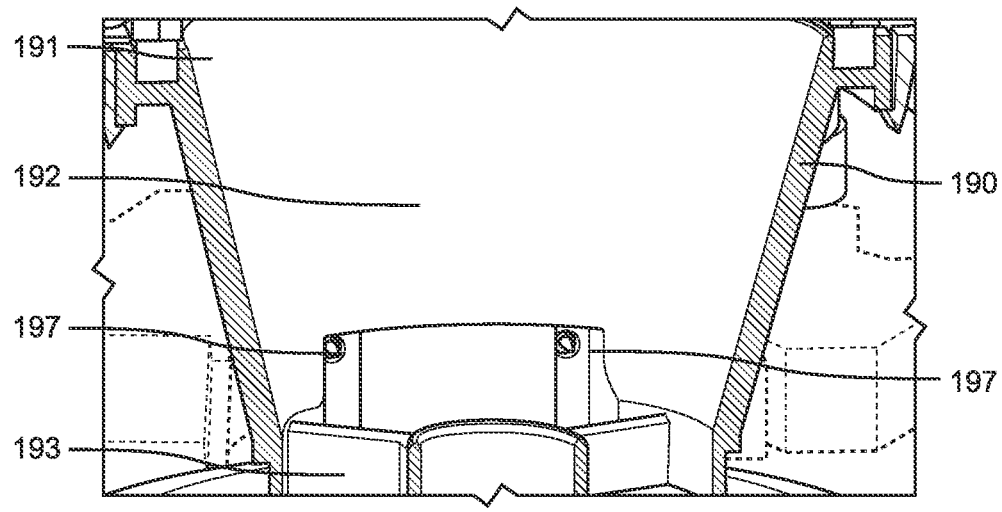
FIG. 21B illustrates in cutaway front elevation view example ionizer probes extending into the inner volume of a chute for a conical burr coffee grinder according to one embodiment of the present disclosure.
Figure 21C:
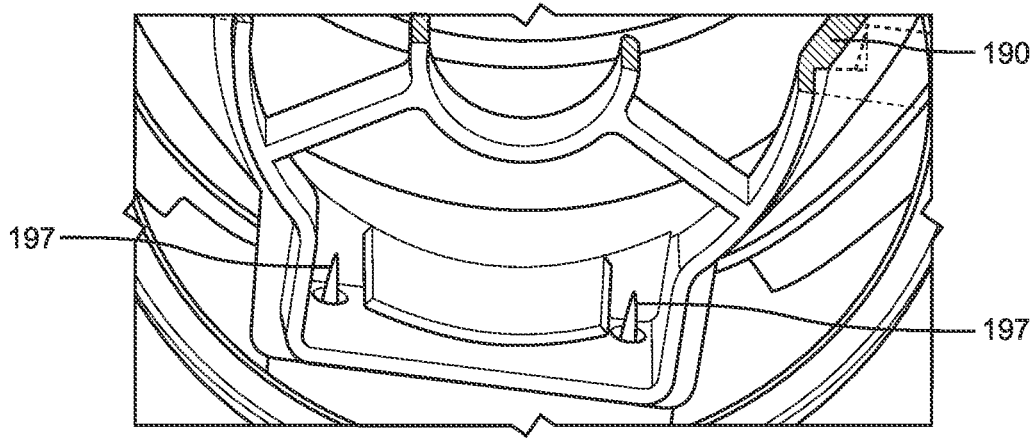
FIG. 21C illustrates in bottom perspective view the ionizer probes and chute of FIG. 21B according to one embodiment of the present disclosure.
Figure 22A:
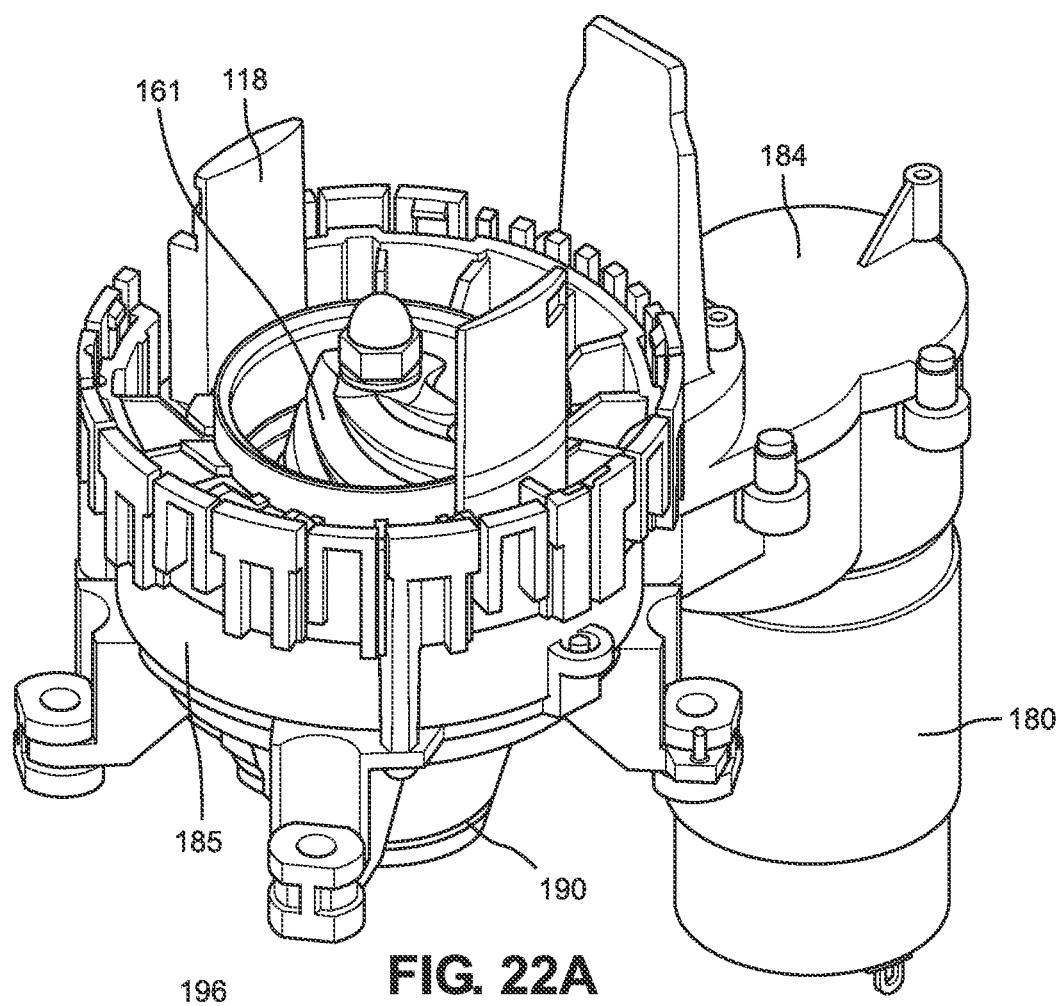
FIG. 22A illustrates in front perspective view an example geartrain assembly for a conical burr coffee grinder according to one embodiment of the present disclosure.
Figure 22B:
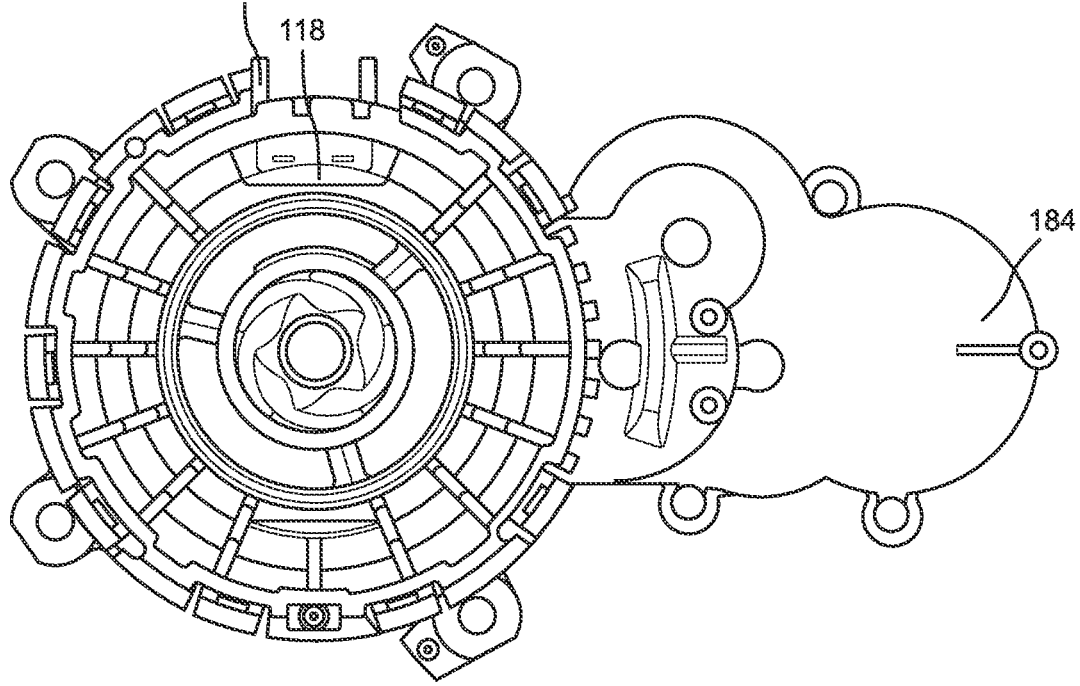
FIG. 22B illustrates in top plan view the geartrain assembly of FIG. 22A according to one embodiment of the present disclosure.
Figure 22C:
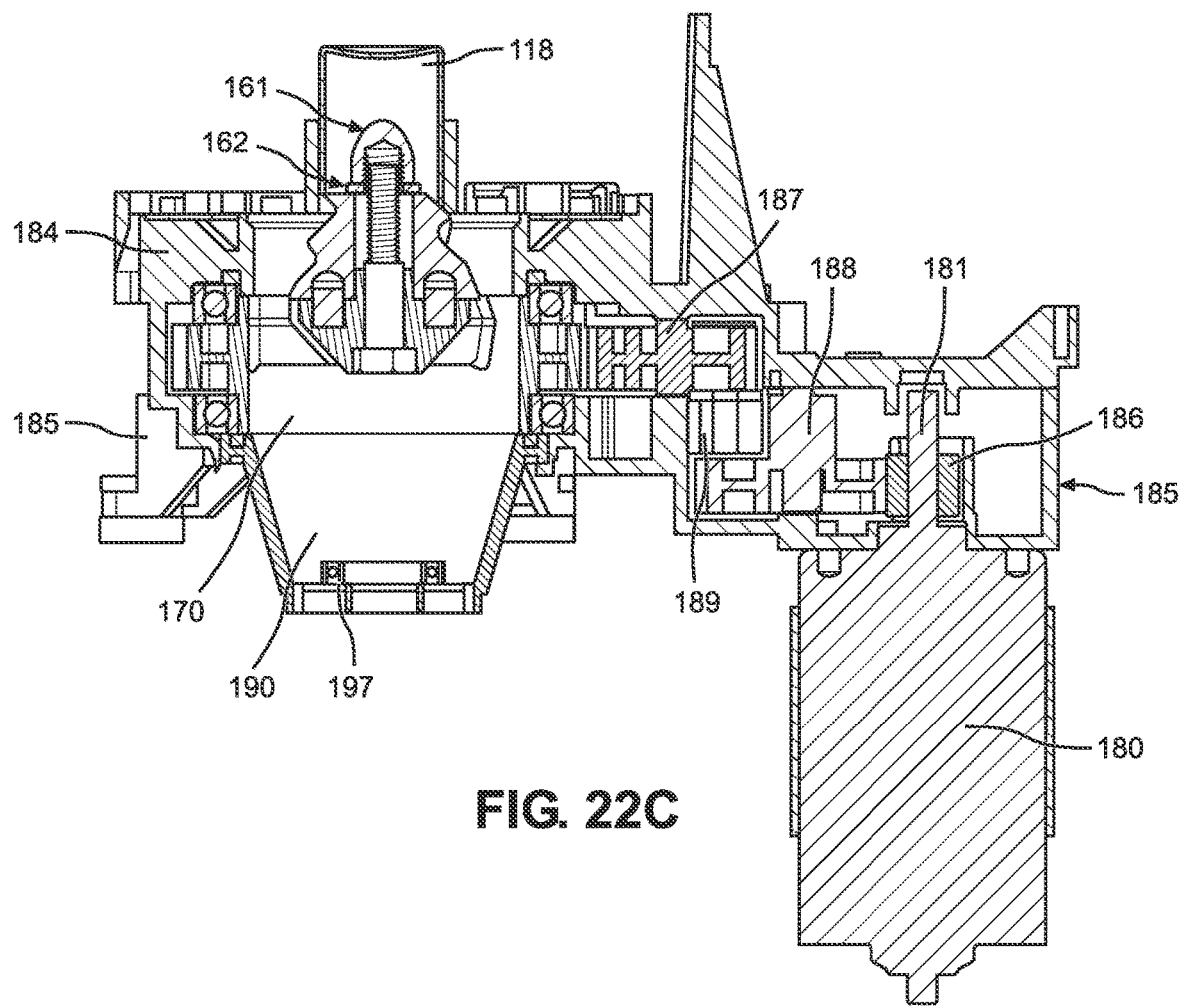
FIG. 22C illustrates in side cross-section view the geartrain assembly of FIG. 22A according to one embodiment of the present disclosure.
Figure 22D:
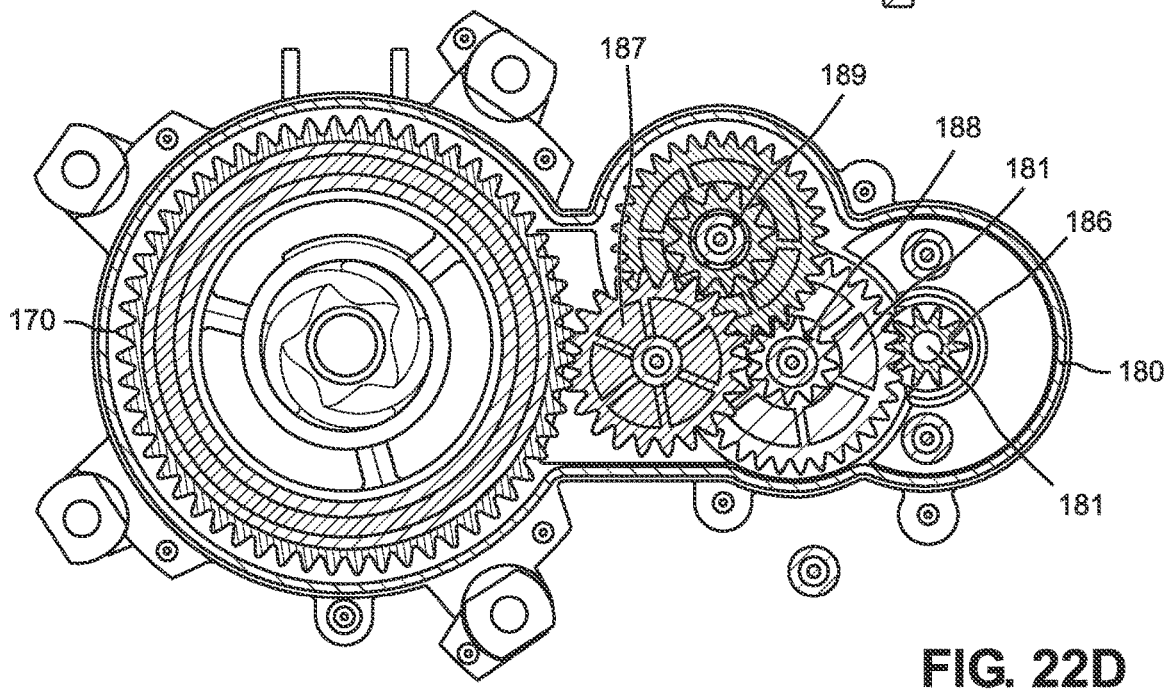
FIG. 22D illustrates in top cross-section view the geartrain assembly of FIG. 22A according to one embodiment of the present disclosure.

FIG. 21A illustrates in rear perspective view an example ionizer installed at a chute for a conical burr coffee grinder, while FIGS. 21B and 21C illustrate example ionizer probes extending into the inner volume of a chute in cutaway front elevation and bottom perspective views respectively. Ionizer 195 can be installed at a back or side location of chute 190, such as by way of an ionizer interface 194 at the chute. Multiple terminal leads 196 can provide positive and negative voltages to ionizer 195, which voltages can be provided from a power box or control unit of the overall conical burr coffee grinder. Multiple probes or needles 197 can extend into the inner volume 192 of chute 190, such as through openings in the back wall or a sidewall.

Ionizer 195 can be configured to operate as a plasma generator or anti-static system to prevent static charge buildup inside chute 190 and within the coffee grounds. Ionizer can effectively eliminate or reduce charges within the chute, which can be plastic, and from coffee grounds passing therethrough, as such coffee grounds may carry some static charges from being processed by metal burrs rubbing quickly together.

In some arrangements, two probes or needles 197 can provide positively charged and negatively charged needle ends inside of chute 190. Needles 197 can poke into the chute 190 and can emit charged ions into the inner volume of the chute. These charged ions can be oppositely charged with respect to the natural static charge buildup in the chute and in the passing coffee grounds. The charged ions emitted into the inner volume of chute 190 can then interact with the fresh coffee grounds passing through the chute to neutralize the static buildup in the coffee. With some or all of the static charges in the coffee grounds eliminated, the produced coffee grounds can then fall into the removable multipurpose container where the grounds are then chargeless, fluffy, and do not stick to sides of the removable container.

Lastly, FIGS. 22A-22D illustrates an example geartrain assembly for a conical burr coffee grinder in front perspective, top plan, side cross-section and top cross-section views respectively. As one particular example, a suitable geartrain assembly can include an upper gearbox housing 184, lower gearbox housing 185, rotational motor 180 with attached pinion 181, pinion gear 186, idler gear 187, first intermediary gear 188, and second intermediary gear 189, among other possible components and features. Other geartrain, housing, and assembly components and arrangements are also possible. As will be readily appreciated, the overall geartrain assembly can be mounted on vibration isolators to minimize vibration and noise during operation of the conical burr coffee grinder.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A conical burr coffee grinder, comprising:
a hopper configured to receive coffee beans;
a grinding arrangement located beneath the hopper, the grinding arrangement including an inner conical burr situated within an outer conical burr, wherein the outer conical burr is oriented about a vertical axis and the outer conical burr is configured to remain stationary while the inner conical burr rotates about the vertical axis to grind the coffee beans between the inner conical burr and the outer conical burr to form coffee grounds;
a grind adjustment assembly located between the hopper and the grinding arrangement, wherein the grind adjustment assembly is configured to facilitate user adjustment of a grind size of the coffee grounds formed by the grinding arrangement across a range from 200 microns to 1200 microns in diameter;
a rotor gear located beneath and coupled to the inner conical burr such that the rotor gear and inner conical burr rotate together as a combined unit about the vertical axis, wherein the rotor gear includes a center, an outer circumference, and one or more vertical openings therethrough between the center and the outer circumference, wherein the rotor gear is configured to be driven by a motor at the outer circumference, and wherein the rotor gear is arranged such that substantially all of the coffee grounds formed by the inner conical burr and outer conical burr fall through the one or more vertical openings;
a chute located beneath the rotor gear, the chute having an upper opening, an inner volume, and a lower opening, wherein the chute is configured to receive the coffee grounds through the upper opening from the rotor gear, pass the coffee grounds through the inner volume, and direct the coffee grounds through the lower opening;
an ionizer located at the chute and configured to project charged ions into the inner volume of the chute while the coffee grounds pass through the inner volume, wherein the charged ions remove static charges from the coffee grounds passing through the inner volume; and
a removable container located beneath the lower opening of the chute and configured to receive the coffee grounds directed through the chute, wherein the coffee beans and the coffee grounds follow a substantially vertical path from the hopper through the grinding arrangement, rotor gear, and chute, and into the removable container during operation of the conical burr coffee grinder.

2. A conical burr coffee grinder, comprising:
a hopper configured to receive coffee beans;
a grinding arrangement located beneath the hopper, the grinding arrangement including an inner conical burr situated within an outer conical burr, wherein the outer conical burr is oriented about a vertical axis and is configured to remain stationary while the inner conical burr rotates about the vertical axis to grind the coffee beans between the inner conical burr and the outer conical burr into coffee grounds;
a rotor gear located beneath and coupled to the inner conical burr such that the rotor gear and the inner conical burr rotate together as a combined unit about the vertical axis, wherein the rotor gear includes a center, an outer circumference, and one or more vertical openings therethrough between the center and the outer circumference, wherein the rotor gear is configured to be driven by a motor at the outer circumference, and wherein the rotor gear is arranged such that substantially all of the coffee grounds formed by the inner conical burr and the outer conical burr fall through the one or more vertical openings; and
a container located beneath the grinding arrangement and configured to receive the coffee grounds dispensed from the grinding arrangement, wherein the coffee beans and the coffee grounds follow a substantially vertical path from the hopper through the grinding arrangement and into the container during operation of the conical burr coffee grinder.

3. The conical burr coffee grinder of claim 2, further comprising:
a rotational motor configured to drive the rotor gear; and
a geartrain between the rotational motor and the rotor gear, wherein the geartrain includes multiple intermediary gears.

4. The conical burr coffee grinder of claim 2, further comprising:
   a removable hopper lid located atop the hopper, wherein the removable hopper lid includes multiple discrete dosing regions therewithin to facilitate the ready measurement of different amounts of coffee beans to be loaded into the hopper.

5. The conical burr coffee grinder of claim 2, further comprising:
   a grind adjustment assembly located between the hopper and the grinding arrangement, wherein the grind adjustment assembly is configured to facilitate adjustment of the grind size of the coffee grounds formed by the inner conical burr and outer conical burr.

6. The conical burr coffee grinder of claim 5, wherein adjustment of the grind adjustment assembly results in raising the outer conical burr with respect to the inner conical burr to increase the grind size of the coffee grounds or lowering the outer conical burr with respect to the inner conical burr to decrease the grind size of the coffee grounds.

7. The conical burr coffee grinder of claim 5, wherein the grind adjustment assembly includes multiple different modes of user input for a user to adjust the grind size of the coffee grounds.

8. The conical burr coffee grinder of claim 7, wherein a first mode of user input is a grind adjustment ring located outside the coffee grinder below the hopper and a second mode of user input is a calibration ring located inside the coffee grinder beneath the hopper.

9. The conical burr coffee grinder of claim 5, wherein the grind adjustment assembly is configured to allow adjustment of the grind size of the coffee grounds across a range from 200 microns to 1200 microns in diameter.

10. The conical burr coffee grinder of claim 2, further comprising:
    a chute located between the grinding arrangement and the container, the chute having an upper opening, an inner volume, and a lower opening, wherein the chute is configured to receive coffee grounds through the upper opening, pass the coffee grounds through the inner volume, and direct the coffee grounds through the lower opening and into the container.

11. The conical burr coffee grinder of claim 10, further comprising:
    an ionizer located at the chute and configured to project charged ions into the inner volume of the chute while coffee grounds pass through the inner volume, wherein the charged ions remove static charges from the coffee grounds passing through the inner volume.

* * * * *